(12) United States Patent
Lopez et al.

(10) Patent No.: US 10,893,473 B2
(45) Date of Patent: Jan. 12, 2021

(54) ENVELOPE MODULATION FOR CONCURRENT TRANSMISSION OF A WAKE-UP SIGNAL AND USER DATA

(71) Applicant: Telefonaktiebolaget LM Ericsson (publ), Stockholm (SE)

(72) Inventors: Miguel Lopez, Solna (SE); Dennis Sundman, Solna (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/319,443

(22) PCT Filed: May 5, 2017

(86) PCT No.: PCT/SE2017/050444
§ 371 (c)(1),
(2) Date: Jan. 21, 2019

(87) PCT Pub. No.: WO2018/017005
PCT Pub. Date: Jan. 25, 2018

(65) Prior Publication Data
US 2019/0268849 A1    Aug. 29, 2019

Related U.S. Application Data

(60) Provisional application No. 62/365,728, filed on Jul. 22, 2016.

(51) Int. Cl.
*H04W 52/02* (2009.01)
*H04B 7/0404* (2017.01)

(52) U.S. Cl.
CPC ...... *H04W 52/0229* (2013.01); *H04B 7/0404* (2013.01); *H04W 52/028* (2013.01); *H04W 52/0216* (2013.01); *Y02D 30/70* (2020.08)

(58) Field of Classification Search
None
See application file for complete search history.

(56) References Cited

U.S. PATENT DOCUMENTS 5,245,346 A * 9/1993 Nishimura ........... G07B 15/063
342/42
9,107,164 B1   8/2015 Troyanker et al.
(Continued)

FOREIGN PATENT DOCUMENTS

EP         2680522 A1   1/2014
WO    2006020125 A2   2/2006
(Continued)

*Primary Examiner* — Jamaal Henson
(74) *Attorney, Agent, or Firm* — Murphy, Bilak & Homiller, PLLC

(57) ABSTRACT

In one aspect, a transmitting device forms an OFDM signal comprising a plurality of OFDM symbols and carrying user data targeted to a main transceiver of one or more receiving devices. The transmitting device modulates the OFDM signal with a wake-up signature (WUS) targeted to awake-up receiver (WUR) of a receiving device other than the one or more receiving devices. The modulating is performed so as to superimpose a modulation of signal power on the OFDM signal, the resulting variations in signal power conveying the wake-up signature. The modulated OFDM signal is transmitted, where a receiving device receives the OFDM at its WUR. The receiving device detect a WUS modulated in the OFDM signal that is targeted to a wake-up receiver of a receiving device other than the one or more receiving devices. The receiving device wakes up its main transceiver in response to the detecting.

14 Claims, 19 Drawing Sheets

(56) References Cited

U.S. PATENT DOCUMENTS

| | | | |
|---|---|---|---|
| 9,525,540 B1* | 12/2016 | Shellhammer | H04L 5/0053 |
| 2004/0057509 A1 | 3/2004 | Porat et al. | |
| 2010/0112950 A1* | 5/2010 | Haartsen | H04B 5/0056 |
| | | | 455/41.3 |
| 2010/0329363 A1* | 12/2010 | Ng | H04L 12/12 |
| | | | 375/257 |
| 2011/0009059 A1* | 1/2011 | Camp, Jr. | H04W 84/02 |
| | | | 455/41.2 |
| 2014/0050133 A1* | 2/2014 | Jafarian | H04W 52/0235 |
| | | | 370/311 |
| 2014/0149758 A1* | 5/2014 | Rajkotia | H04L 12/2816 |
| | | | 713/310 |
| 2014/0211678 A1* | 7/2014 | Jafarian | H04W 52/0216 |
| | | | 370/311 |
| 2014/0269462 A1* | 9/2014 | Jia | H04W 52/0229 |
| | | | 370/311 |
| 2016/0047884 A1* | 2/2016 | Zhang | G01S 5/0284 |
| | | | 342/458 |
| 2016/0119865 A1 | 4/2016 | Kennedy et al. | |
| 2016/0373237 A1* | 12/2016 | Shellhammer | H04L 7/043 |
| 2016/0374021 A1* | 12/2016 | Alpman | H04W 52/0229 |
| 2016/0374022 A1* | 12/2016 | Ang | H04W 52/0235 |
| 2017/0111858 A1* | 4/2017 | Azizi | H04L 27/261 |
| 2017/0181090 A1 | 6/2017 | Park et al. | |
| 2018/0255515 A1* | 9/2018 | Gupta Hyde | H04W 88/08 |

FOREIGN PATENT DOCUMENTS

| | | | |
|---|---|---|---|
| WO | 2015026803 A1 | 2/2015 | |
| WO | 2018017008 A1 | 1/2018 | |

\* cited by examiner m-th bit in WUS is a 0 → all the frequency domain constellation symbols belonging to the m-th OFDM symbol are drawn from this constellation m-th bit in WUS is a 1 → all the frequency domain constellation symbols belonging to the m-th OFDM symbol are drawn from this constellation

ENVELOPE MODULATION FOR CONCURRENT TRANSMISSION OF A WAKE-UP SIGNAL AND USER DATA

TECHNICAL FIELD

The present invention generally relates to reducing power consumption when detecting signals in wireless communication networks, and particularly relates to a transmitting device that sends a signal with a wake-up signature (WUS) to a receiving device having a wake-up receiver (WUR) that uses less power than a main transceiver and that listens for the WUS in order to wake up the main transceiver to receive user data.

BACKGROUND

The so-called Internet of Things (IoT) is expected to increase the number of connected devices significantly. A vast majority of these devices will likely operate in unlicensed bands, in particular the 2.4 GHz ISM band. At the same time, there is also increased demand for using the unlicensed bands for services that traditionally have been supported in licensed bands. As an example of the latter, the Third Generation Partnership Project (3GPP) that has developed several wireless communications standards for licensed bands has now also developed versions of Long Term Evolution (LTE) that will operate in the 5 GHz unlicensed band.

A large number of these IoT devices are expected to be powered by small batteries, which means that energy consumption is of outmost importance. In the future, it may even be so that these devices will be able to harvest their energy themselves, potentially even further increasing the importance of low energy consumption.

For these kind of applications, the supported data rates are low, both concerning peak data rates and an aggregated data rate during, say, an average day. This means that a major part of the power is not consumed when the IoT device is transmitting or receiving data, but rather when the devices are listening to determine whether there might be a transmission for which it is the intended receiver.

The fact that such a large part of the total energy consumption is due to listening for a potential transmission, just to find out that the transmission is not there, has motivated the development of so-called wake-up receivers (WUR). A WUR is a device that has extremely low power consumption and whose only purpose is to wake up the main transceiver. So, an IoT device with a WUR will not need to turn on the main receiver to scan for a potential packet, but will instead turn on the WUR. If in fact there is data for the IoT device, a wake-up signature (WUS) will be sent to the WUR. When the WUR has decoded this WUS, and determined that there in fact is data present, it will then wake up the main receiver and transmitter, and a communication link can be established.

Although the power consumption for WUR is very low, it also comes with some shortcomings. For example, the WUR performance typically is much worse, both concerning sensitivity and selectivity. That is, the range for a WUR is often considerably smaller than for the main receiver, although one can reduce the difference due to the fact that the data rate for the WUS may typically be much lower than for the main receiver used for actual data. The reduced selectivity comes from the fact that it is difficult to generate a precise frequency reference that can be used for down-conversion of the signal, and thus it is not feasible to have a narrow-band selectivity filter. This, in turn, means that interfering signals that are relatively far from the WUR in frequency can still degrade its sensitivity significantly.

SUMMARY

Embodiments of the present invention involve transmitting the WUS concurrently with user data by modulating the envelope of a data packet. The data packet is destined to a first user whose main radio is awake and listening. The WUS is destined to a second user whose main radio may be asleep but which possesses a WUR. The WUS modulates the envelope of the data packet, resulting in, for example, Amplitude Shift Keying (ASK). Naturally, modulating the envelope will result in distortions to the data packet. The embodiments described herein disclose methods and apparatuses to modulate the envelope of the data packet in such a way that the impact to the link performance experienced by the first data user is small or negligible.

This approach may address some of the existing shortcomings. First, since user data is multiplexed with the WUS, the channel is more efficiently used. Second, since user data is also transmitted, potentially interfering devices that are using some kind of carrier sense multiple access with collision avoidance (CSMA/CA) more likely will find the channel to be busy and therefore defer from initiating a transmission. Third, legacy receivers not aware that an overlaid WUS is present will be able to successfully decode the packet with little loss of performance. This approach may also allow for spectrum efficient use of WURs, and improve the performance of the WURs in the sense that it reduces the likelihood that the WUS would suffer interference.

This approach also facilitates the introduction of WURs in networks where there are legacy nodes not aware that there is a new class of devices expecting a WUS. Various embodiments described herein apply to Orthogonal Frequency-Division Multiplexing/Orthogonal Frequency-Division Multiple Access (OFDM)/OFDMA) networks. In particular, the approach can be advantageously employed in wireless networks based on the 802.11 standard (e.g., 802.11a/g/n/ac/ and in the future 802.11ax), or on the LTE standard (e.g., LTE-U).

According to some embodiments, a method in a transmitting device includes forming an OFDM signal comprising a plurality of OFDM symbols and carrying user data targeted to a main transceiver of one or more receiving devices. The method also includes modulating the OFDM signal with a WUS targeted to a WUR of a first receiving device other than the one or more receiving devices, wherein said modulating is performed so as to superimpose a modulation of signal power on the OFDM signal, the resulting variations in signal power conveying the WUS and transmitting the modulated OFDM signal.

According to some embodiments, a method in a receiving device having a WUR and a main transceiver of the receiving device, where the WUR uses less power than the main transceiver to listen for a WUS in order to wake up the main transceiver to receive user data, includes receiving, at the WUR, an OFDM signal comprising a plurality of OFDM symbols and carrying user data targeted to a main transceiver of one or more receiving devices other than the receiving device. The method also includes detecting a WUS modulated in the OFDM signal, where the WUS comprises a superimposition of signal power on the OFDM signal, the resulting variations in signal power conveying the WUS.

The method further includes waking up the main transceiver in response to the detecting of the WUR.

According to some embodiments, a transmitting device includes transceiver circuitry configured to receive and transmit signals and processing circuitry operatively associated with the transceiver circuitry. The processing circuitry is configured to form an OFDM signal comprising a plurality of OFDM symbols and carrying user data targeted to a main transceiver of one or more receiving devices. The processing circuitry is also configured to modulate the OFDM signal with a WUS targeted to a WUR of a first receiving device other than the one or more receiving devices. The modulation is performed so as to superimpose a modulation of signal power on the OFDM signal, the resulting variations in signal power conveying the WUS. The processing circuit is configured to transmit, via the transceiver circuitry, the modulated OFDM signal.

According to some embodiments, a receiving device includes main transceiver circuitry and WUR circuitry, where the WUR circuitry uses less power than the main transceiver circuitry to listen for the WUS in order to wake up the main transceiver circuitry to receive user data. The receiving device also includes processing circuitry operatively associated with the main transceiver circuitry and the WUR circuitry and configured to receive, at the WUR circuitry, an OFDM signal comprising a plurality of OFDM symbols and carrying user data targeted to a main transceiver of one or more receiving devices other than the receiving device. The processing circuitry is also configured to detect a WUS modulated in the OFDM signal, where the WUS comprises a superimposition of signal power on the OFDM signal, the resulting variations in signal power conveying the WUS, and wake up the main transceiver circuitry in response to the detecting.

The method may also be implemented by apparatus, devices, computer readable medium, computer program products and functional implementations.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
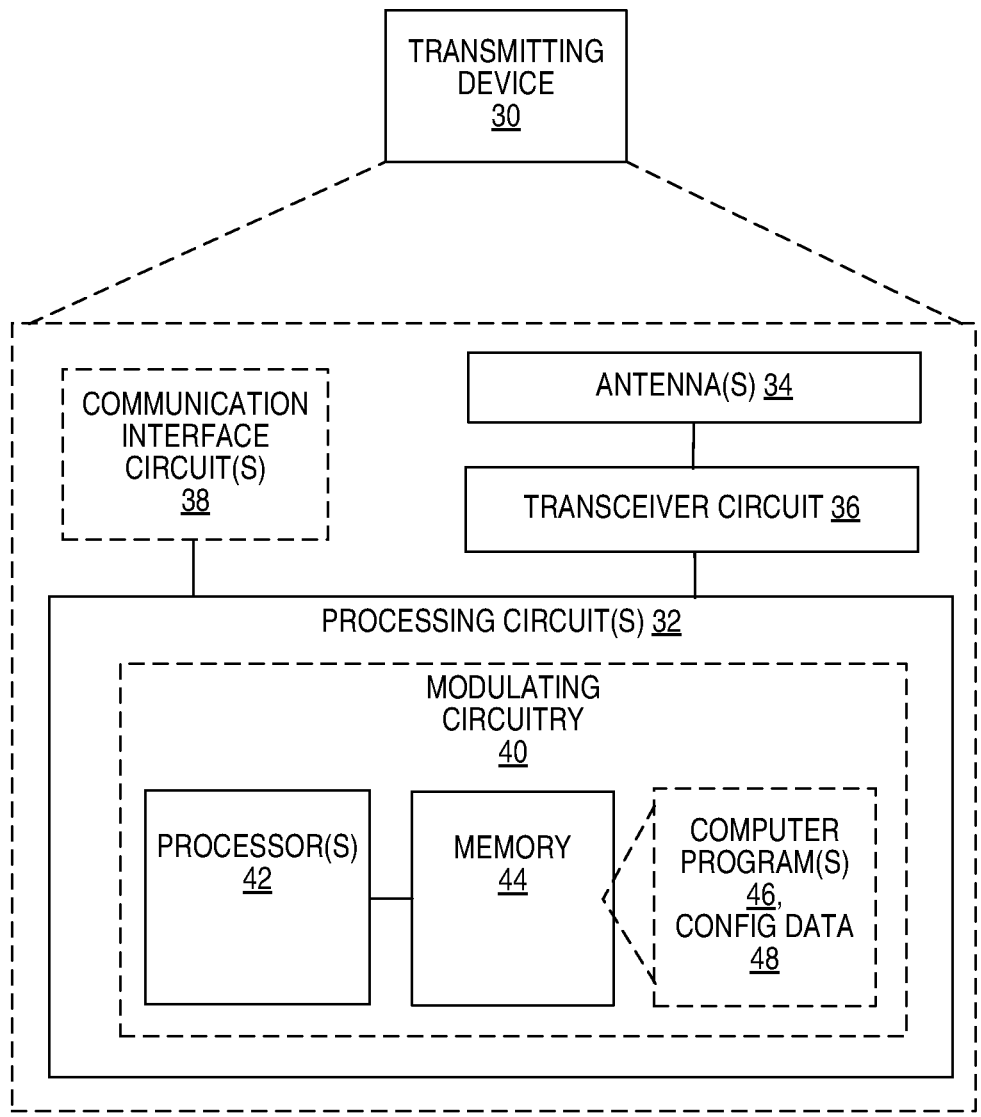
FIG. 1 is a block diagram illustrating an example transmitting device, according to some embodiments.

Embodiments of the present invention are applicable in OFDM and OFDMA packet-based wireless systems. Examples of such systems are Wi-Fi networks based on the 802.11 standard (e.g. 802.11a/g/n/ac/ax) or LTE-U.

An OFDM or OFDMA signal carries a number of frequency domain constellation symbols in each OFDM symbol. The constellation symbols are often drawn from quadrature amplitude modulation (QAM) constellations (e.g., in 802.11 and LTE), although other symbol constellations may be used. The bits to be transmitted over the air are grouped into groups of one or more bits, and each bit group is mapped to one of these constellation symbols. At the receiver side, the equalized received samples give an estimate of the transmitted constellation symbol. Using these estimated constellation symbols the receiver computes estimates (so-called soft or hard) of the original bits. A key property of each symbol constellation is the existence of optimum decision regions in the complex (real and imaginary) plane. These regions divide the complex plane and allow the receiver to make the best guess as to what the original bits are.

Embodiments of the present invention describe a way to overlay a WUS on top of a data packet in a manner that is transparent to the data user. In other words, the receiver expecting a data packet may operate in exactly the same way (i.e., channel filtering, equalization, demodulation, decoding, etc.) independently of whether a WUS is overlaid on the data packet. This is achieved by modulating the OFDM signal with a WUS targeted to a WUR. The modulating may include signaling the WUS at a rate of one bit for each OFDM symbol in the data packet. For example, in 802.11ac the duration of one OFDM symbol (including cyclic prefix) is 4 us. Therefore, a WUS can be transmitted at a rate of 1/4e-6=250 kbps. The modulating may also include signaling each bit in the WUS by changes in the amplitude of the corresponding OFDM symbol, in such a way that from the point of view of the receiver of the data packet. The optimum decision regions for the frequency domain constellation symbols remain unchanged. This means that after cyclic prefix removal and Fast Fourier Transform (FFT) at the OFDM receiver side, the optimum decision regions for the data bits carried by the OFDM signal are the same, whether a WUS is present or not.

At the receiver side, the first receiver (an OFDM receiver expecting a data packet) may operate exactly as if the WUS is not present. In particular, the OFDM receiver needs not detect the presence of the WUS. In this way, legacy receivers (i.e., receivers not aware that a WUS may be overlaid on a packet) will still be able to decode packets even when a WUS is overlaid on top of the data packet. The second receiver (WUR) will receive non-coherent Amplitude Shift Keying (ASK). Receiver architectures for non-coherent ASK are well known in the art and outside of the scope of the present invention.

In some cases, it may be convenient to overlay the WUS only on a part of a data packet. For example, Wi-Fi packets (e.g., 802.11a/g/n/ac/ax) start with a preamble, consisting of training fields and a physical layer header. The preamble is followed by the payload, carrying one or more media access control (MAC) protocol data units (PDUs). The receiver performs packet detection, synchronization and channel estimation on the preamble. It may be advantageous to overlay the WUS only on the payload, leaving the preamble unperturbed. This ensures that the performance of detection, synchronization and decoding of the physical layer header is not degraded.

Several embodiments of the invention are presented, which may be applied in different wireless systems. FIG. 1 illustrates an example transmitting device 30, according to some embodiments. The transmitting device 30 may be a radio access network node that facilitates communication between user equipments (UEs) and the core network. In using the generic terminology of "radio access network node", a radio access network node can be a base station, radio base station, base transceiver station, base station controller, network controller, evolved Node B (eNB), Node B, relay node, access point, radio access point, Remote Radio Unit (RRU) or Remote Radio Head (RRH). In the case where the transmitting device is a radio access network node, the radio access network node may include a communication interface circuit 38 that includes circuitry for communicating with other nodes in the core network, radio nodes, and/or other types of nodes in the network for the purposes of providing data and cellular communication services.

The transmitting device 30 may also be a wireless device, such as a device in Internet of Things (IoT), a user equipment or any wireless device that may utilize Carrier Aggregation (CA) or License Assisted Access (LAA) in a network. Examples of a wireless device include a radio communication device, target device (device targeted for communication), device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

The transmitting device 30 communicates with other devices via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards (GSM), general packet radio service (GPRS), wideband code division multiple access (WCDMA), high-speed downlink packet access (HSDPA), LTE and LTE-Advanced. The transceiver circuit 36 may also operate according to other technologies, such as Wi-Fi, BLUETOOTH and ZIGBEE technologies.

The transmitting device 30 also includes one or more processing circuits 32 that are operatively associated with the transceiver circuit 36 to communicate with other devices and, in some cases, operatively associated with the communication interface circuit 38 to communicate with network nodes. The communication may include multi-carrier operations. The term "multi-carrier" may involve similar terms such as "multi-carrier system", "multi-cell operation", "multi-carrier operation", and "multi-carrier" transmission and/or reception. Multi-carrier operation may also be considered to involve CA.

For ease of discussion, the one or more processing circuits 32 are referred to hereafter as "the processing circuit 32." The processing circuit 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 32 may comprise fixed circuitry, or programmable circuitry that is specially configured via the execution of program instructions implementing the functionality taught herein, or may comprise some mix of fixed and programmed circuitry. One or more of the processors 42 may be multi-core having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32.

In general, the memory 44 comprises one or more types of computer-readable storage media providing non-transitory storage of the computer program 46 and any configuration data 48 used by the network node 30. Here, "non-transitory" means permanent, semi-permanent, or at least temporarily persistent storage and encompasses both long-term storage in non-volatile memory and storage in working memory, e.g., for program execution.

In some embodiments, the processor 42 of the processing circuit 32 executes a computer program 46 stored in the memory 44 that configures the processor 42 to form an OFDM signal comprising a plurality of OFDM symbols and carrying user data targeted to a main transceiver of one or more receiving devices. The processing circuit 32 is also configured to modulate the OFDM signal with a WUS targeted to a WUR of a first receiving device other than the one or more receiving devices, where the modulation is performed so as to superimpose a modulation of signal power on the OFDM signal, the resulting variations in signal power conveying the WUS. The processing circuit 32 is configured to use the transceiver circuit 36 to transmit the modulated OFDM signal. This functionality may be performed by modulation circuitry 40 in processing circuit 32.

Figure 2:
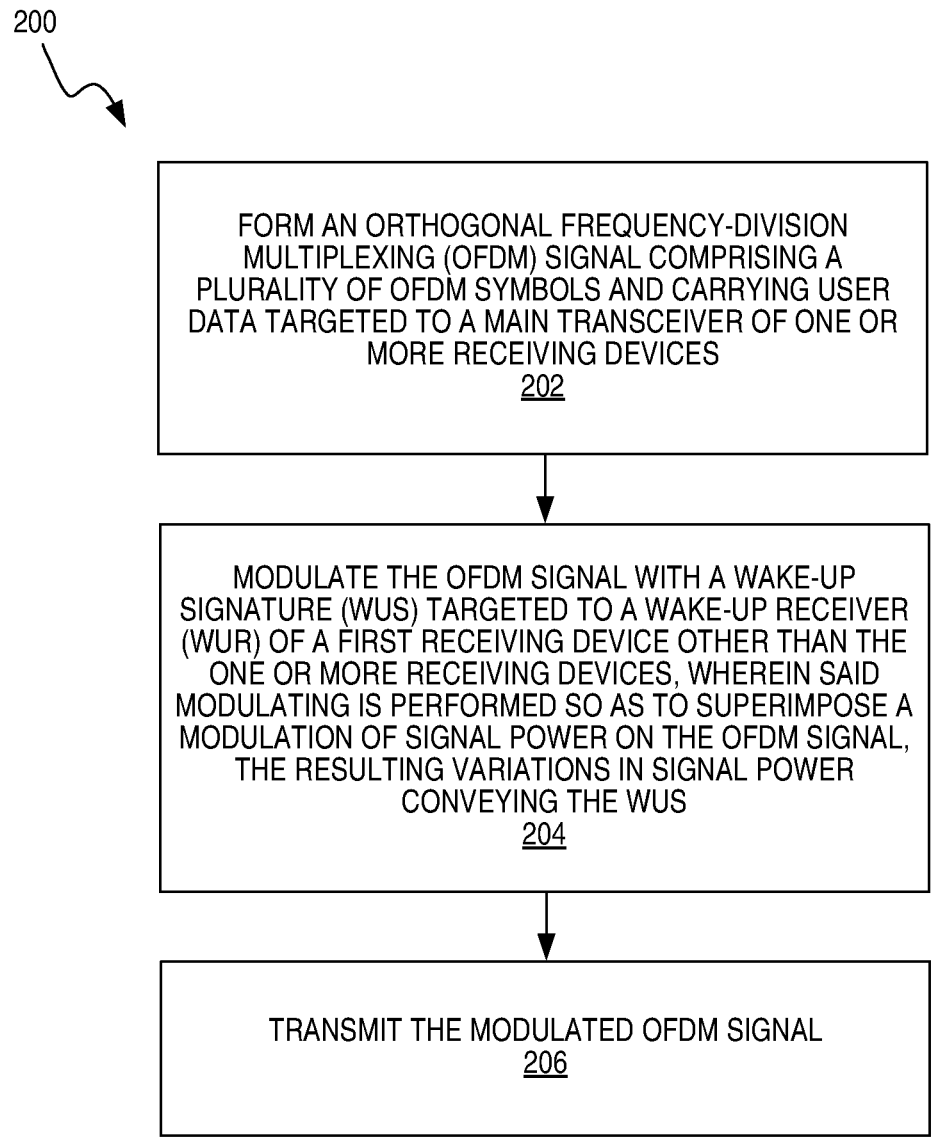
FIG. 2 shows a flow chart illustrating a method of modulating user data OFDM symbol with a WUS, according to some embodiments.

The processing circuit 32 of the network node 30 is configured to perform various methods, such as method 200 of FIG. 2. The method 200 includes forming an OFDM signal comprising a plurality of OFDM symbols and carrying user data targeted to a main transceiver of one or more receiving devices (block 202). The method 200 also includes modulating the OFDM signal with a WUS targeted to a WUR of a first receiving device other than the one or more receiving devices, where the modulating is performed so as to superimpose a modulation of signal power on the OFDM signal, the resulting variations in signal power conveying the WUS (block 204). The method 200 further includes transmitting the modulated OFDM signal (block 206). The modulation of the OFDM signal with the WUS may be performed so as to superimpose either a logical one or a logical zero of the WUS onto each of multiple ones of the plurality of OFDM symbols. Logical ones and zeroes of the WUS may be superimposed onto fewer than all of the OFDM symbols carrying the user data.

In some embodiments, the user data is carried in the OFDM signal by real-valued frequency-domain symbols and modulating the OFDM signal with the WUS includes signaling a first logical bit value of the WUS with a first OFDM symbol of the OFDM signal by adding imaginary-valued frequency-domain symbols to the real-valued frequency-domain symbols in the first OFDM symbol. The adding of imaginary-valued frequency-domain symbols involves an addition of imaginary-valued energy. The modulating also includes signaling a second logical bit value of the WUS with a second OFDM symbol of the OFDM signal by refraining from adding imaginary-valued energy to the real-valued frequency-domain symbols in the second OFDM symbol. That is, no imaginary-valued frequency-domain symbols are added. The real-valued frequency-domain symbols may consist of symbols from a pulse amplitude modulation (PAM) symbol constellation or binary-phase-shift-keying (BPSK) symbols.

In other embodiments, the "real" and "imaginary" of the frequency-domain symbols may be swapped, while still achieving the same result. For example, the user data may be carried in the OFDM signal by imaginary-valued frequency-domain symbols, and the modulating of the OFDM signal with the WUS may include signaling a first logical bit value of the WUS with a first OFDM symbol of the OFDM signal by adding real-valued frequency-domain symbols to the imaginary-valued frequency-domain symbols in the first OFDM symbol. This may also include signaling a second logical bit value of the WUS with a second OFDM symbol of the OFDM signal by refraining from adding real-valued energy to the imaginary-valued frequency-domain symbols in the second OFDM symbol.

In some embodiments, the user data is conveyed in the OFDM signal with frequency-domain symbols taken from a phase-shift-keying (PSK) symbol constellation and modulating the OFDM signal with the WUS includes signaling a first logical bit value of the WUS with a first OFDM symbol of the OFDM signal by assigning a first amplitude to all of the frequency-domain symbols in the first OFDM symbol. The modulating then includes signaling a second logical bit value of the WUS with a first OFDM symbol of the OFDM signal by assigning a second amplitude to all of the frequency-domain symbols in the second OFDM symbol, the second amplitude differing from the first amplitude.

In some cases, modulating the OFDM signal with the WUS includes signaling a first logical bit value of the WUS in a first signaling period by applying a first windowing function to an OFDM symbol in the first signaling period, and signaling a second logical bit value in a second signaling period by applying a second windowing function to an OFDM symbol in the second signaling period. Applying the first windowing function to the OFDM symbol in the first signaling period may include assigning a first power to a beginning part of the OFDM symbol in the first signaling period and assigning a second power to an ending part of the OFDM symbol in the first signaling period. Applying the second windowing function to the OFDM symbol may include assigning the second power to a beginning part of the OFDM symbol in the second signaling period and assigning the first power to an ending part of the OFDM symbol in the first signaling period.

Figure 3:
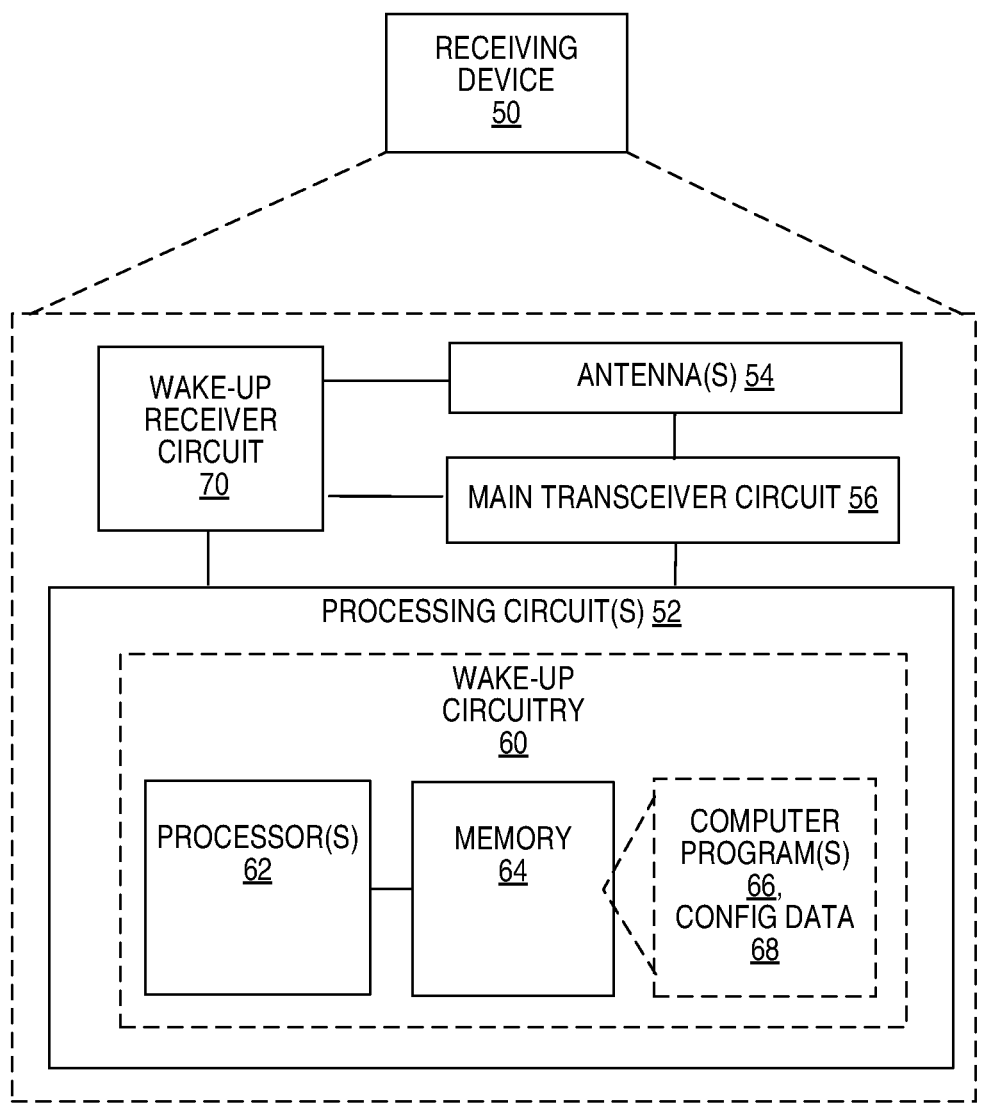
FIG. 3 is a block diagram illustrating an example receiving device, according to some embodiments.

To complement the transmitting device 30 of FIG. 1, FIG. 3 illustrates a block diagram of a receiving device 50, according to some embodiments. The receiving device 50 may also be a wireless device, such as a device in the IoT, a UE or any wireless device that may utilize CA or LAA in a network. Examples of a wireless device include a radio communication device, target device (device targeted for communication), D2D UE, machine type UE or UE capable of M2M, a sensor equipped with UE, iPAD, tablet, mobile terminals, smart phone, LEE, LME, USB dongles, CPE, etc.

The receiving device 50 communicates with a transmitting device, such as transmitting device 30, via antennas 54 and a main transceiver circuit 56. The main transceiver circuit 56 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced. The main transceiver circuit 56 may communicate via other technologies such as Wi-Fi, BLUETOOTH and ZIGBEE technologies. The main transceiver circuit 56 is used to receive user data.

The receiving device 50 also includes a WUR 70 that operates with less power than the main transceiver circuit 56. The WUR 70 operates to listen for and detect a signal with a WUS. The WUR 70 is configured to, upon detection of such a signal, wake up the main transceiver circuit 56. The WUR 70 is configured to utilize one or more of various technologies or protocols for communications, including one or more of those utilized by the main transceiver circuit 56.

The receiving device 50 includes one or more processing circuits 52 that are operatively associated with the main transceiver circuit 56 and the WUR 70. The processing circuit 52 comprises one or more digital processors 62, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. One or more of the processors 62 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

In some embodiments, the processor 62 of the processing circuit 52 may execute a computer program 66 stored in the memory 64 that configures the processor 62 to receive, at the WUR 70, an OFDM signal comprising a plurality of OFDM symbols and carrying user data targeted to a main transceiver of one or more receiving devices other than the receiving device 50. The processing circuit 52 is also configured to detect a WUS modulated in the OFDM signal, where the WUS comprises a superimposition of signal power on the OFDM signal, the resulting variations in signal power conveying the WUS. The WUR 70 of the receiving device 50 may have been targeted for the WUS. The processing circuit 52 is also configured to wake up the main transceiver in response to the detecting of the WUR. This functionality and other described functions may be performed by wake-up circuitry 60.

Figure 4:
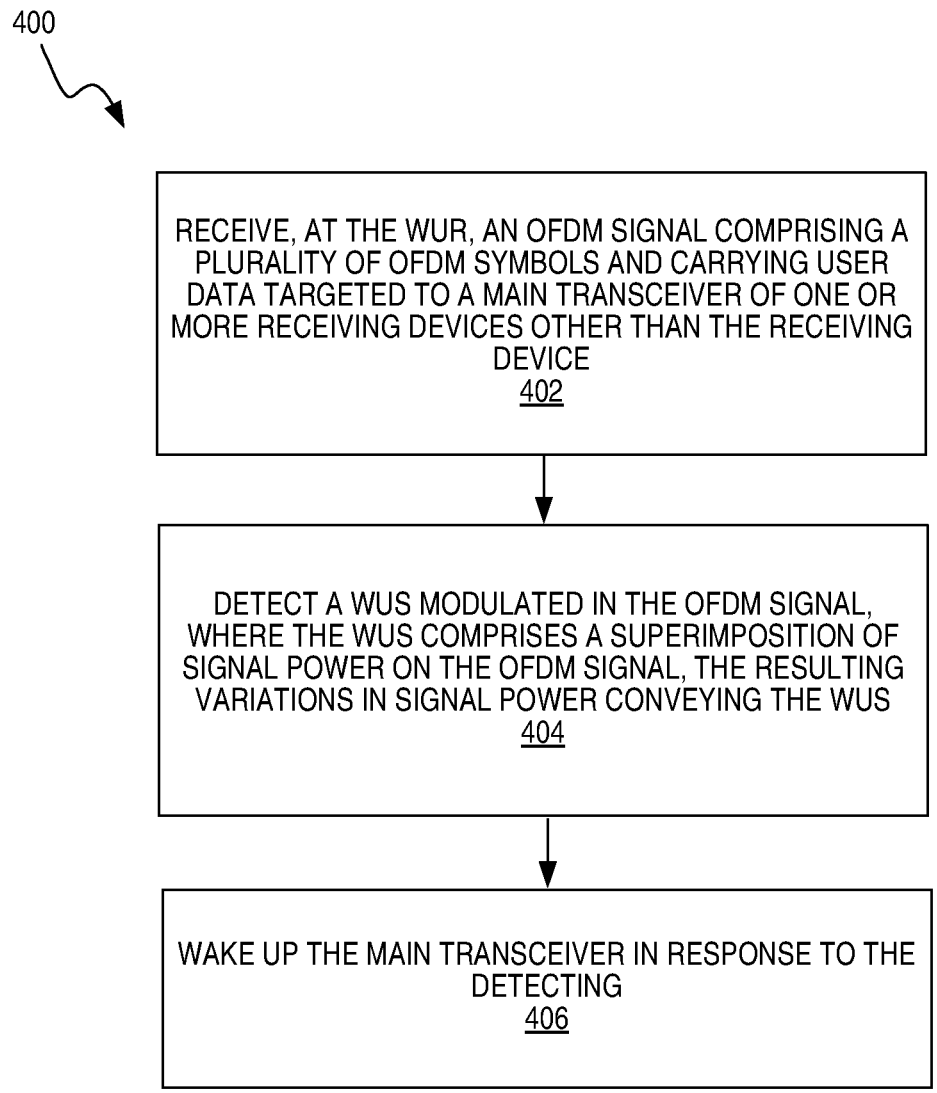
FIG. 4 shows a flow chart illustrating a method of waking up a main transceiver, according to some embodiments.

Likewise, the processing circuit 52 is configured to perform a method, such as method 400 illustrated by FIG. 4. The method 400 includes receiving, at the WUR, an OFDM signal comprising a plurality of OFDM symbols and carrying user data targeted to a main transceiver of one or more receiving devices other than the receiving device (block 402). The method 400 also includes detecting a WUS modulated in the OFDM signal, where the WUS comprises a superimposition of signal power on the OFDM signal, the resulting variations in signal power conveying the WUS (block 404) and waking up the main transceiver in response to the detecting (block 406).

In some cases, the user data is carried in the OFDM signal by real-valued frequency-domain symbols and detected by determining a first logical bit value of the WUS signaled with a first OFDM symbol of the OFDM signal by detecting imaginary-valued frequency-domain symbols that are added to the real-valued frequency-domain symbols in the first OFDM symbol and determining a second logical bit value of the WUS signaled with a second OFDM symbol of the OFDM signal by detecting no additional imaginary-valued energy added to the real-valued frequency-domain symbols in the second OFDM symbol.

In some cases, the user data is conveyed in the OFDM signal with frequency-domain symbols taken from a phase-shift-keying (PSK) symbol constellation and the detecting includes determining a first logical bit value of the WUS signaled with a first OFDM symbol of the OFDM signal by detecting a first amplitude for the first OFDM symbol and determining a second logical bit value of the WUS signaled with a first OFDM symbol of the OFDM signal by detecting a second amplitude for the second OFDM symbol, the second amplitude differing from the first amplitude.

In other cases, the detecting may include determining a first logical bit value of the WUS signaled in a first signaling period by detecting a first windowing function applied to an OFDM symbol in the first signaling period and determining a second logical bit value signaled in a second signaling period by detecting a second windowing function applied to an OFDM symbol in the second signaling period. In some embodiments, the first and/or second windowing functions correspond to Manchester coding.

In another embodiment, OFDM wireless systems use real-valued frequency domain constellations, such as PAM constellations (2-PAM, 4-PAM etc.). For example, these type of frequency domain constellation symbols are used in the modulation and coding scheme (MCS) MCS 0 defined in 802.11ac (2-PAM is equivalent to Binary PSK, or BPSK).

Figure 5:
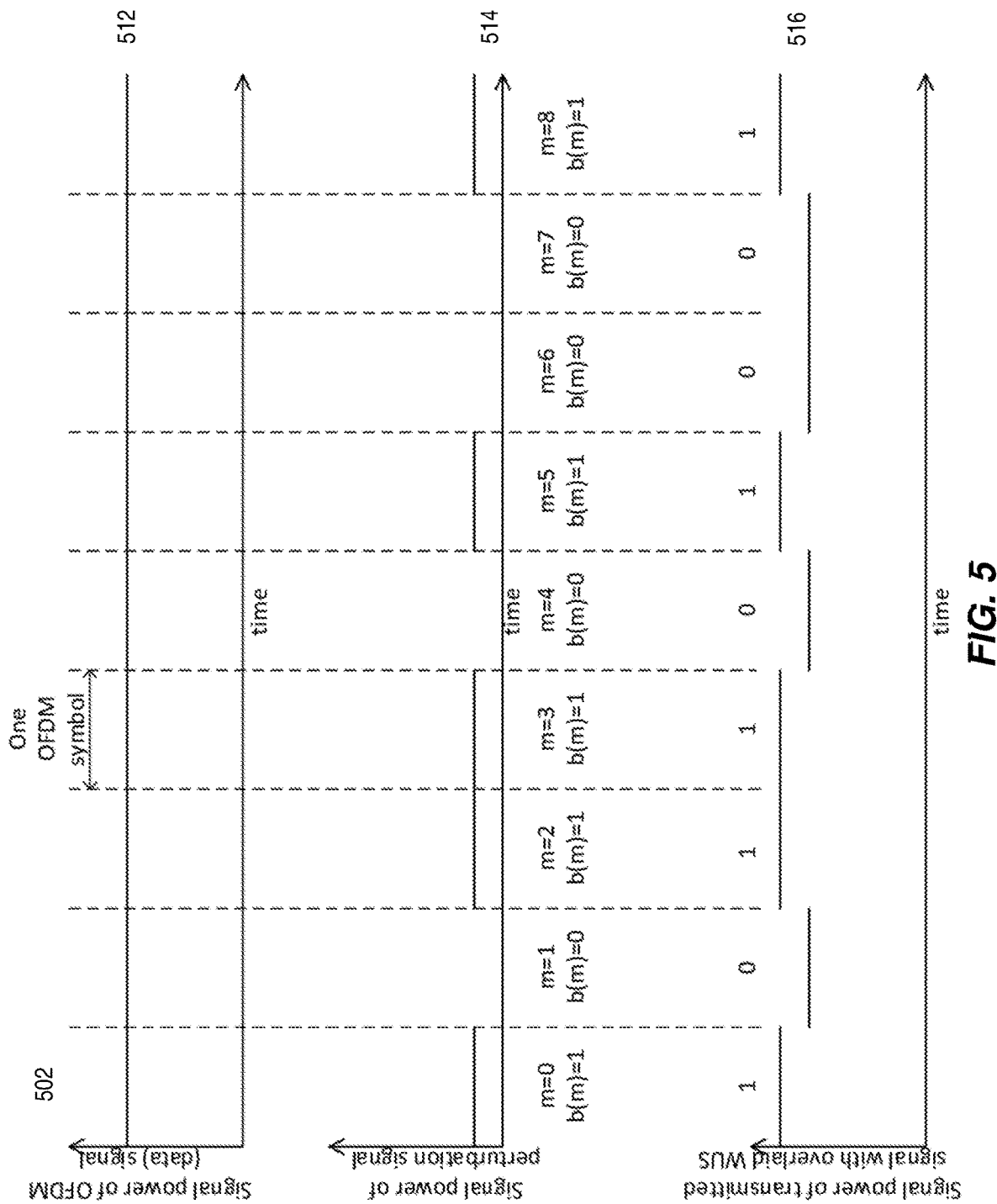
FIG. 5 illustrates signal power, according to some embodiments.

Since PAM is employed, the imaginary part of the signal space is unused. In this example, the WUS is signaled by adding purely imaginary constellation symbols to the PAM constellation symbols carried in each OFDM symbol 502 where a first logical value (e.g., logical 1) is to be transmitted, and not altering the other OFDM symbols where a second logical value (e.g., logical 0) is transmitted. The power of these purely imaginary constellation symbols is kept constant. Hence, the average power over any given OFDM symbol will have two possible values as illustrated in FIG. 5, where the WUS consists of bits b(m), m=0, 1, . . . 8. By adding imaginary parts to the PAM symbols, the original OFDM signal 512 is perturbed. Therefore, the transmitted signal 516 consists of a superposition of the data signal 512 and a perturbation signal 514. To summarize, to signal a first logical value such as 0 in the WUS, keep the constellation symbol real, but reduce the energy. To signal a second logical 1 in the WUS, let the real part of the constellation symbol be the same as in the previous step, but add extra energy in the orthogonal, imaginary dimension. The power of these purely imaginary constellation symbols is kept constant.

Figure 6:
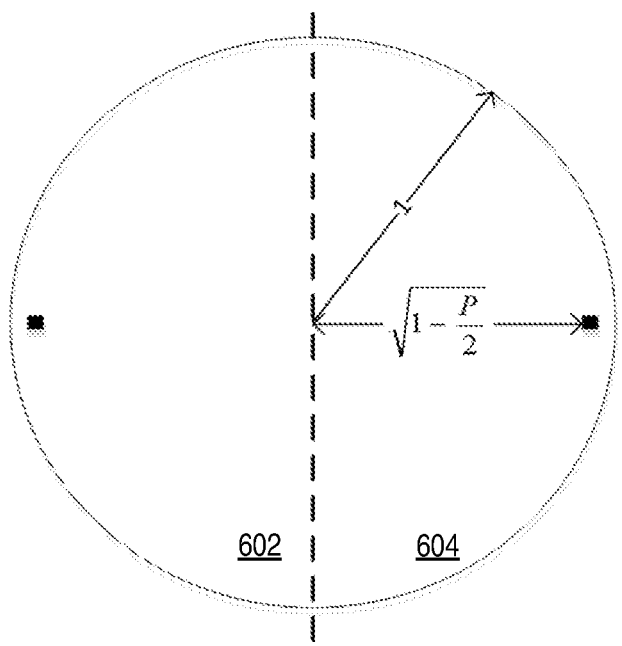
FIG. 6 illustrates modification of BPSK constellation, according to some embodiments.
Figure 6:
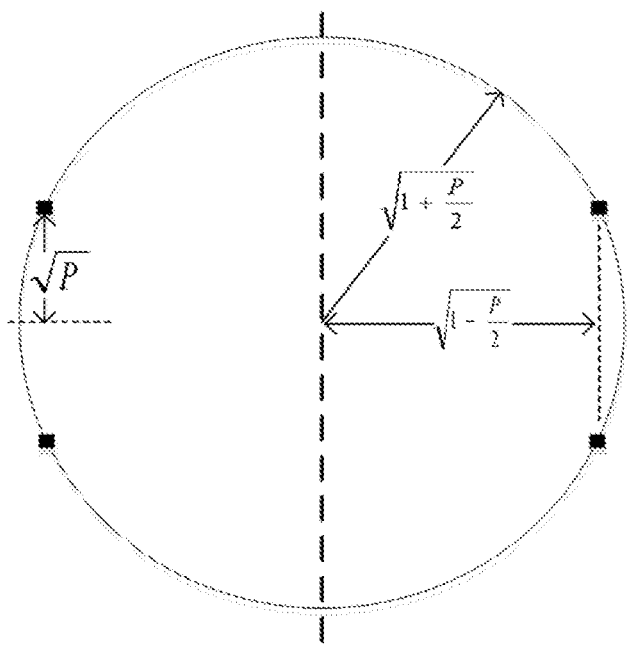

Suppose that the data signal uses BPSK, and that it is desired to employ ASK for the WUS, having two levels separated by a power P. Then, according to some embodiments, a logical 0 is signaled by employing a real-valued binary symbol constellation for all constellation symbols in the corresponding OFDM symbol, and a logical 1 by employing an unbalanced complex-valued quaternary symbol constellation for all constellation symbols in the corresponding OFDM symbol, as shown in FIG. 6. FIG. 6 illustrates modification of BPSK constellation. The black squares represent the constellation points of the frequency domain symbols. The average power of the transmitted signal is 1, but the power may change by an amount P from one OFDM symbol to the next.

At the OFDM receiver side, the optimum decision regions for the frequency domain, equalized samples, are the left half plane 602 and the right half plane 604, illustrated in FIG. 6 by a dashed line dividing the circles in two equal parts and marking the boundary of the optimum decision regions. The optimum decision regions for BPSK constellations or any of the constellations in FIG. 6 are identical. Hence, the decision region is unchanged by adding a perturbation signal that is orthogonal to the data signal in the frequency domain.

A detailed description of such an embodiment is given below. The following notation will be used: N for the number of subcarriers; M for the number of OFDM symbols; m for the index for the OFDM symbol; k for the index for the sub-carrier; and $S_m(k)$, k=0, . . . , N−1, m=0, . . . , M−1 real valued frequency domain constellation symbol (e.g., BPSK or PAM) corresponding to a first data user. Furthermore, it will be assumed that $E[|S_m(k)|^2]=1$, for all m and k.

Let $\varepsilon_m(k)$ k=0, . . . , N−1, m=0, . . . , M−1 real valued, with zero mean and unit power, $E[|\varepsilon_m(k)|^2]=1$, for all m and k. This is the perturbation signal. It is desired to overlay a WUS consisting of a bit sequence $(b_m)_{m=0}^{M-1}$ to the WUR. The average power of the transmitted signal shall be 1, but the power difference among OFDM symbols may vary by an amount 0<P<1. Then new constellation symbols $X_m(k)$ are generated by adding an imaginary part to the constellation symbol $S_m(k)$ and properly rescaling the power of the real and imaginary parts:

$$X_m(k) = \begin{cases} \sqrt{1-\frac{P}{2}} \cdot S_m(k) & \text{if } b_m = 0 \\ \sqrt{1-\frac{P}{2}} \cdot S_m(k) + j\sqrt{P} \cdot \mathcal{E}_m(k) & \text{if } b_m = 1 \end{cases}, 0 \leq k < N$$

The resulting constellation symbols are depicted in FIG. 6, where it is assumed that the symbols $\varepsilon_m(k)$ are binary. In general, the symbols $\varepsilon_m(k)$ need not be binary.

Figure 7:
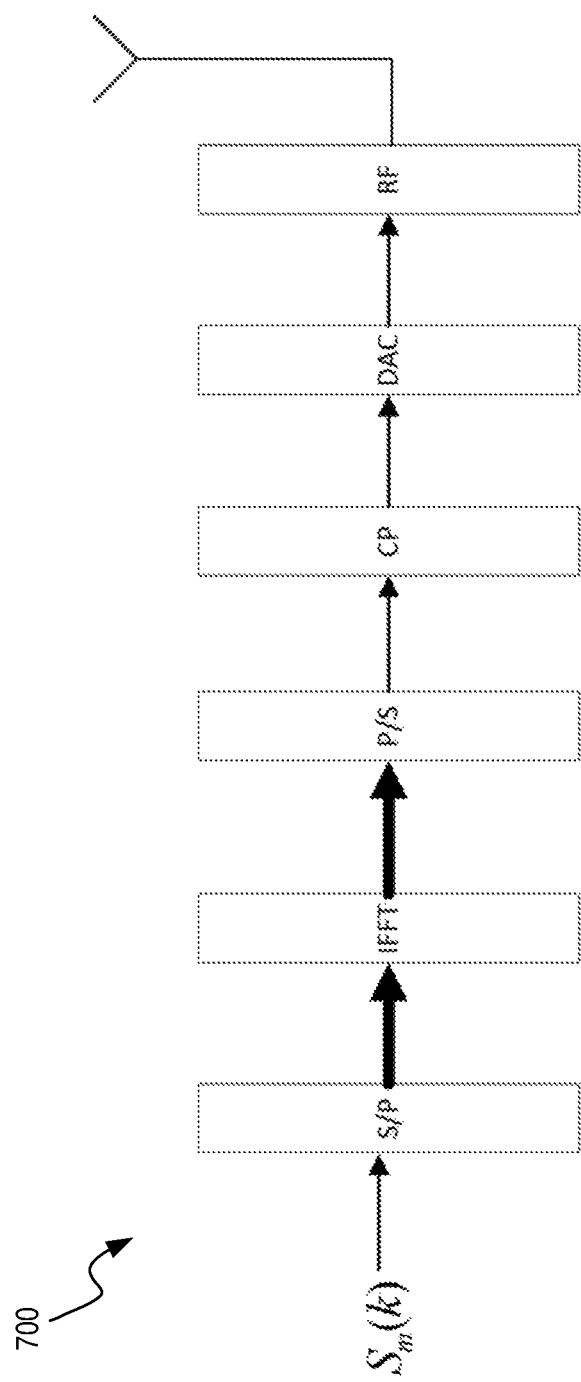
FIG. 7 illustrates an OFDM modulator.
Figure 8:
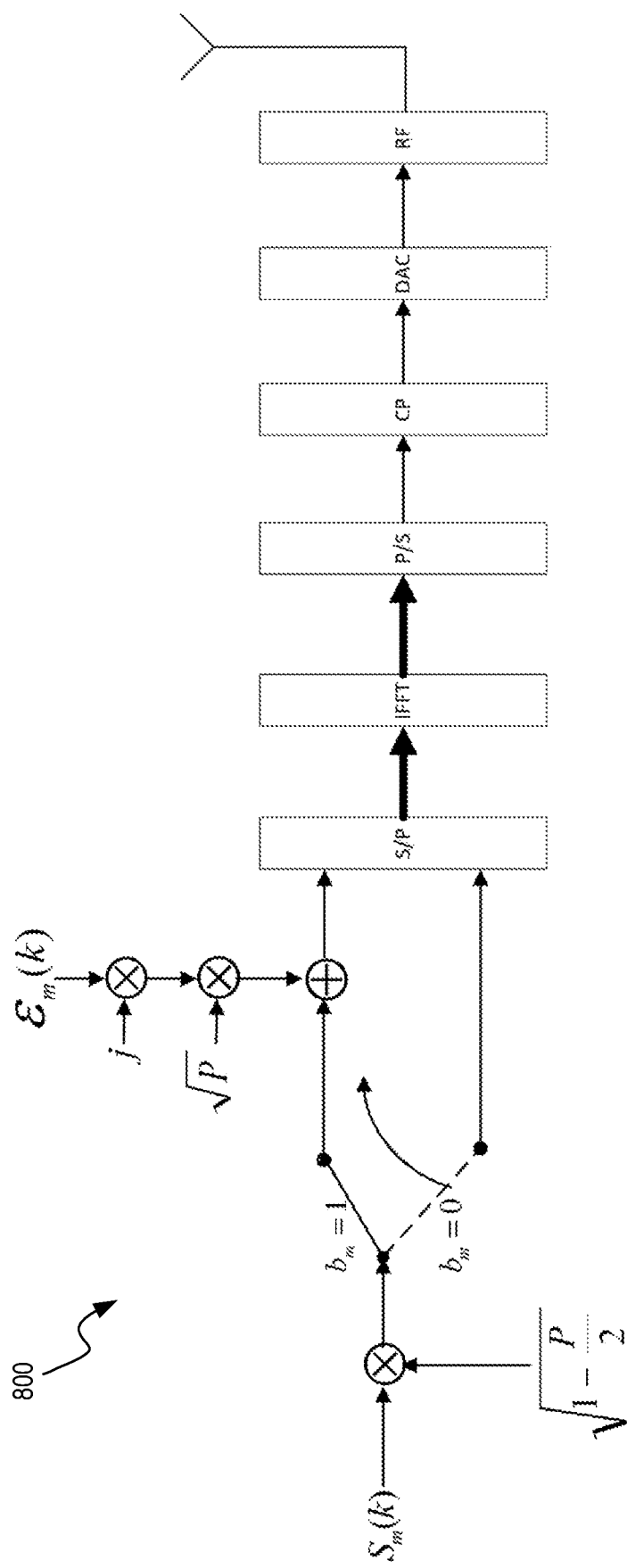
FIG. 8 illustrates an OFDM modulator, according to some embodiments.

An ordinary OFDM modulator 700 is depicted in the block diagram in FIG. 7. An OFDM modulator 800 modified according to some embodiments is depicted in FIG. 8. It will be appreciated that the OFDM modulator 800 of FIG. 8 may be implemented with the processing circuits 32 and the main transceiver circuit 36 of the transmitting device 30 in FIG. 1; the Radio Frequency (RF) section of the OFDM modulator 800 in FIG. 8 is typically found in the main transceiver circuit 36, while the Digital-to-Analog Converter (DAC) section may sometimes be found in the main transceiver circuit 36. The remaining portions of the illustrated OFDM modulator are typically implemented with dedicated digital logic, but some or all of these portions may be implemented with a microprocessor, microcontroller, digital signal processor, or the like, executing appropriate software or firmware.

In the illustrated OFDM modulator 800, the WUS is signaled using ASK, by muting some of the symbols $\varepsilon_m(k)$. Suppose that the bit sequence $(b_m)_{m=0}^{M-1}$ is to be transmitted to a given WUR. When the m-th bit is zero, the symbols $\{\varepsilon_m(k): 0 \leq k < N\}$ are zeroed (equivalently, these symbols are not transmitted). Otherwise they are transmitted.

According to another embodiment, an OFDM wireless system uses PSK frequency domain symbol constellations (e.g. BPSK, QPSK or 8-PSK). For example, these types of frequency domain constellation symbols are used in the modulation and coding scheme (MCS) MCS 0, MCS 1 and MCS 2 defined in 802.11ac. QPSK is also employed in LTE-U. In this embodiment, the WUS is signaled by varying the amplitude of the constellation symbols carried in each OFDM symbol. When a logical 0 is to be transmitted, all the frequency domain symbols carried by the corresponding OFDM symbol are given a first amplitude, and when a logical 1 is to be transmitted, all the frequency domain symbols carried by the corresponding OFDM symbol are given a second amplitude. The amplitudes are chosen so that the average power is as desired and a predefined power difference among OFDM symbols is achieved.

Figure 9:
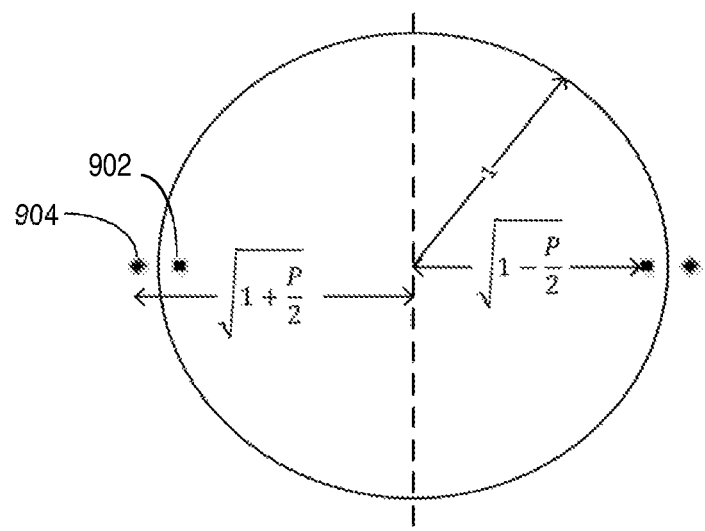
FIG. 9 illustrates constellation symbols, according to some embodiments.

FIG. 9 illustrates how a BPSK constellation can be modified according to this embodiment. A logical 0 is signaled by drawing all the constellation symbols carried by the corresponding OFDM symbol from the binary constellation depicted by black squares 902. A logical 1 is signaled by drawing all the constellation symbols carried by the corresponding OFDM symbol from the binary constellation depicted by black diamonds 904. Notice that the optimum decision regions are unchanged. The dashed line in FIG. 9 marks the limit of the optimum decision region for BPSK as well as for the two constellations shown in the figure.

Figure 10:
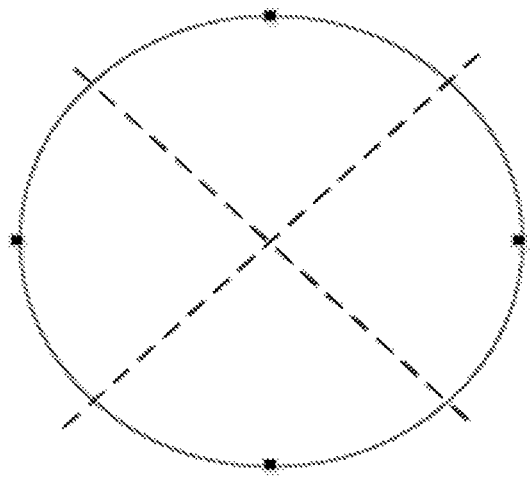
FIG. 10 illustrates a QPSK constellation.
Figure 11:
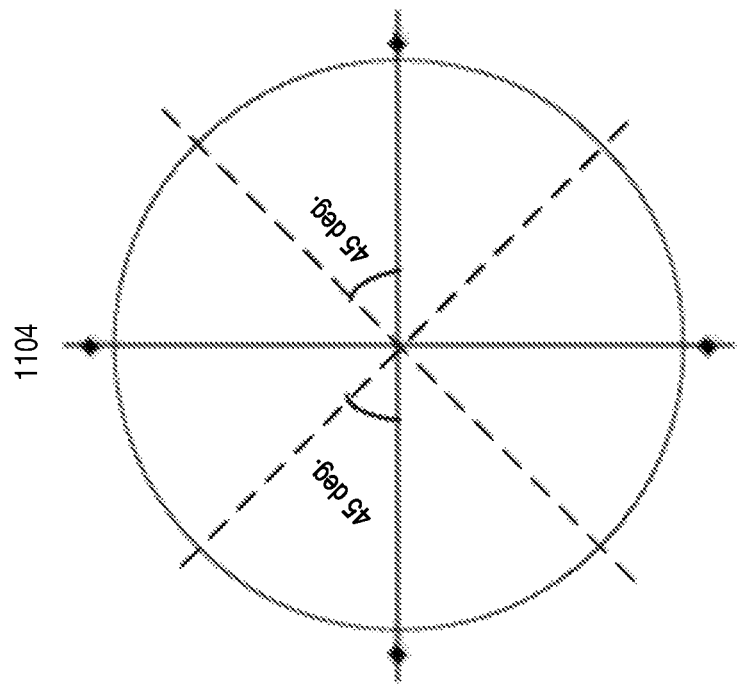
FIG. 11 illustrates constellation symbols, according to some embodiments.
Figure 11:
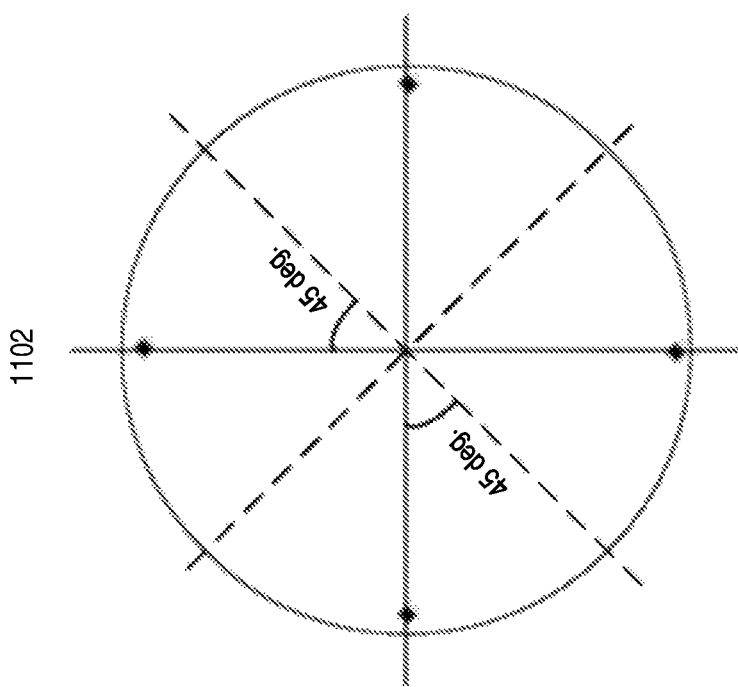

FIG. 10 illustrates a QPSK constellation. The optimum decision regions are delimited by the dashed lines. FIG. 11 shows how to modify the QPSK constellation symbols according to this embodiment. A logical 0 is signaled by drawing all the constellation symbols carried by the corresponding OFDM symbol from the quaternary constellation depicted on the left constellation 1102. A logical 1 is signaled by drawing all the constellation symbols carried by the corresponding OFDM symbol from the quaternary constellation depicted on the right constellation 1104. Note that the optimum decision regions are the same for all constellations shown in FIGS. 10 and 11.

Figure 12:
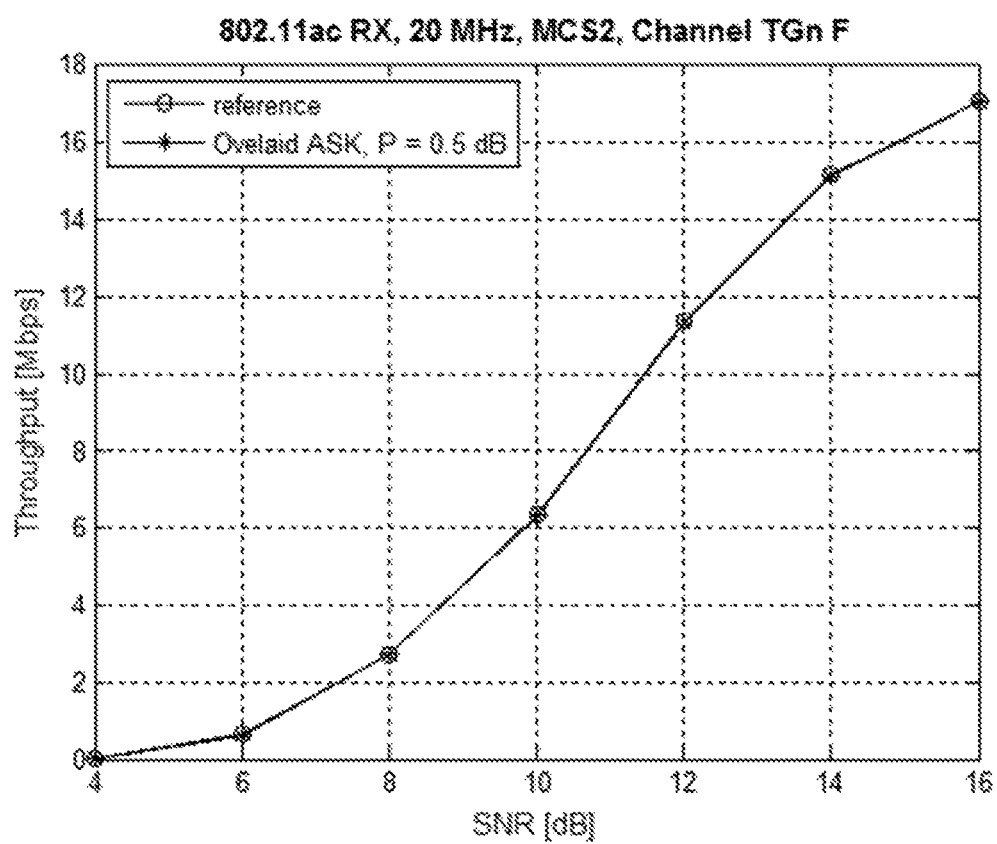
FIG. 12 shows performance of a legacy receiver, according to some embodiments.

FIG. 12 shows the performance of a legacy receiver. The setting is 802.11ac, MCS-2 (QPSK), and a fading channel model IEEE F. The reference utilizes a QPSK symbol constellation like the one depicted in FIG. 10. An ASK signal is overlaid using constellations like those one depicted in FIG. 11, with a power difference between the two levels of P=0.5 dB. It can be seen that overlaying the WUS degrades the performance of a legacy receiver by less than 0.1 dB, so that in practice the degradation is negligible.

A detailed description of an embodiment is given below. The following notation will be used. The following notation will be used: N for the number of subcarriers; M for the number of OFDM symbols; m for the index for the OFDM symbol; k for the index for the sub-carrier; and $S_m(k)$, k=0, . . . , N−1, m=0, . . . , M−1 PSK frequency domain constellation symbol (e.g. BPSK, QPSK or 8-PSK) corresponding to a first data user. Furthermore, it will be assumed that $E[|S_m(k)|^2]=1$, for all m and k.

Then new constellation symbols $X_m(k)$ are generated by modulating the amplitude of the PSK symbols $S_m(k)$ as follows:

$$X_m(k) = \begin{cases} \sqrt{1-\frac{P}{2}} \cdot S_m(k) & \text{if } b_m = 0 \\ \sqrt{1+\frac{P}{2}} \cdot S_m(k) & \text{if } b_m = 1 \end{cases}, 0 \leq k < N$$

Figure 13:
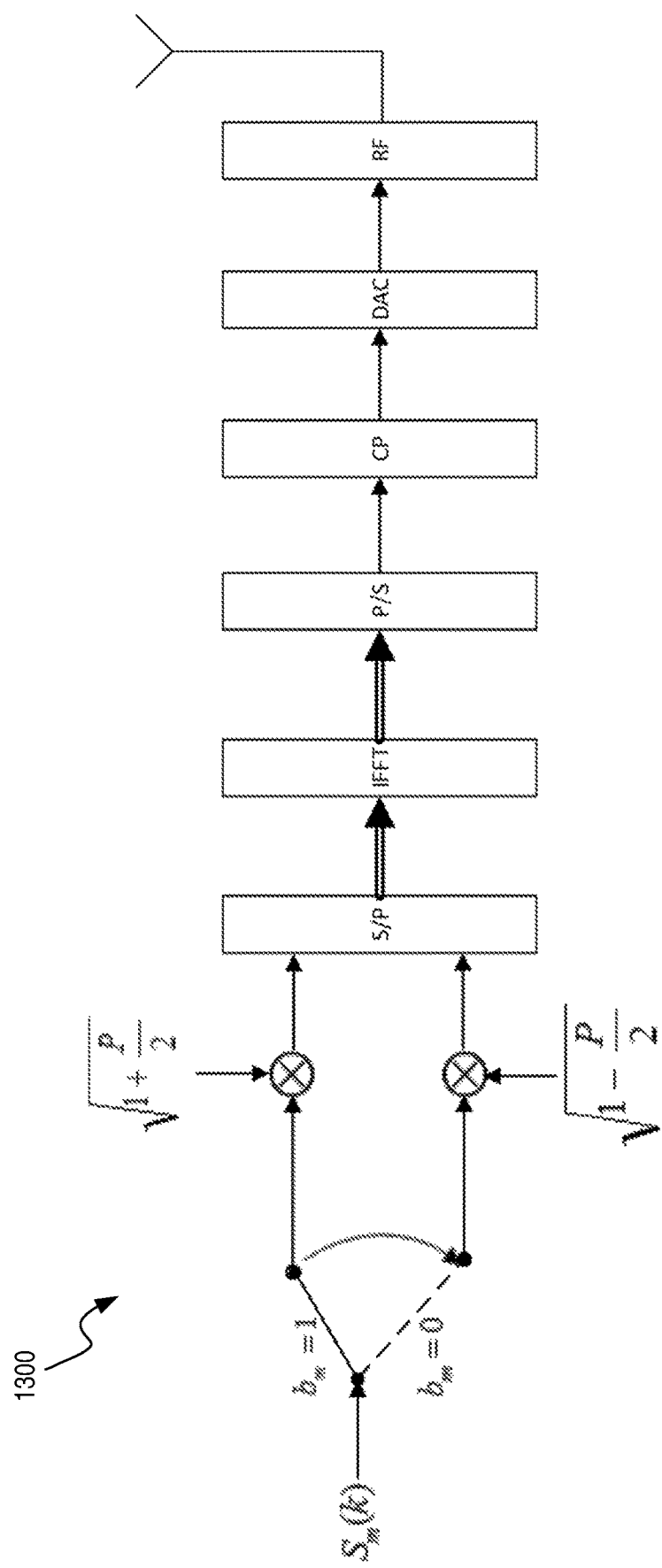
FIG. 13 illustrate an OFDM modulator, according to some embodiments.

It is desired to overlay a WUS consisting of a bit sequence $(b_m)_{m=0}^{M-1}$ to the WUR. The average power of the transmitted signal shall be 1, but the power difference among OFDM symbols may vary by an amount 0<P<1. Then new constellation symbols $X_m(k)$ are generated by properly rescaling the power. These new symbols $X_m(k)$ are fed to an OFDM modulator 1300 and transmitted, as illustrated in FIG. 13.

In another embodiment, a OFDM wireless system uses PSK frequency domain symbol constellations (e.g., BPSK, QPSK or 8-PSK). However, it is particularly attractive for systems employing BPSK frequency domain constellations. This type of frequency domain constellation symbols is used in the MCS 0 defined in 802.11ac. Some of the previous embodiments operate in the frequency domain, but this embodiment operates in the time domain. While this description uses a BPSK scheme, any other constellation mapping is possible.

Figure 14:
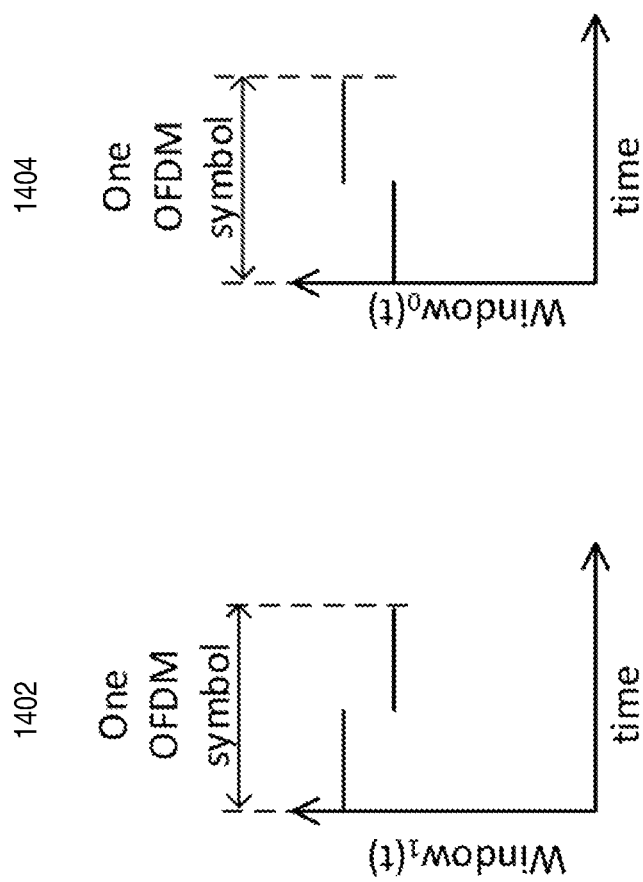
FIG. 14 illustrates windowing functions.
Figure 15:
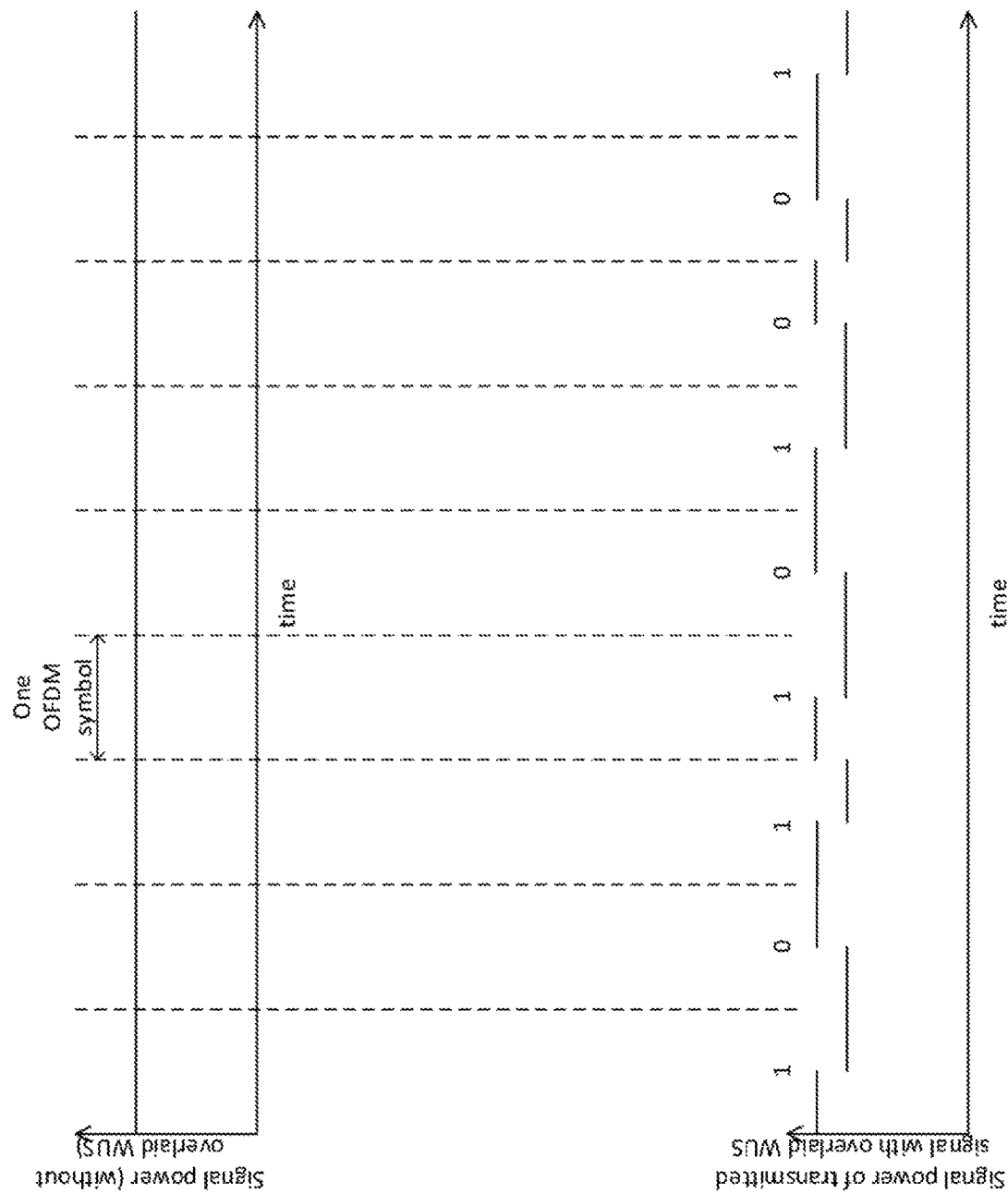
FIG. 15 illustrates the use of windowing functions to overlay a WUS onto an OFDM signal, according to some embodiments.

The WUS is signaled at a lower rate than the data, with only one bit signaled every OFDM symbol. Positive real-valued windowing functions $Window_p(t)$, p=0,1, are chosen, subject to a symmetry constraint which shall be described later. A logical 0 is signaled to the WUS in the m-th signaling period by applying a first windowing function $Window_o(t)$ to the m-th OFDM symbol. Similarly, a logical 1 is signaled to the WUS during the m-th signaling period by applying a second windowing function $Window_1(t)$ to the m-th OFDM symbol. Different windows result in changes in the power envelope of the transmitted signal that can be detected by the WUR. To window a signal means pointwise multiplication of the signal and the windowing function. FIG. 14 illustrates two windowing functions 1402 and 1404, and FIG. 15 illustrates how the windowing functions are used to overlay the WUS on an OFDM signal.

A detailed description of the embodiment is given below. The following notation will be used.

$\Re$e: real part
$\Im$m: imaginary part
t: continuous time
n: discrete time
N: Number of subcarriers, assumed to be even for the sake of simplicity.
$N_{CP}$: Length of the cyclic prefix, in samples taken at the nominal rate.
$N_{tot}=N+N_{CP}$: total number of samples in one OFDM symbol
M: Number of OFDM symbols
m: Index for the OFDM symbols
k: Index for the sub-carriers
$T_{OFDM}$: OFDM symbol duration (excluding cyclic prefix)
$T_{CP}$: Cyclic prefix duration
b(m) or $b_m$: m-th bit comprised in the WUS
$T=T_{OFDM}+T_{CP}$: Total duration of one OFDM symbol, including the cyclic prefix.
$rect_T(t)$: Rectangular pulse, having the value 1 for $0 \le t < T$ and 0 otherwise. The (ideal) time domain OFDM signal x(t) transmitted to the data user can be written, in the baseband, in the following form:

$$x(t) = C \cdot \sum_{m=0}^{M-1} \left( \sum_{k=0}^{N-1} S_m(k) \exp\left(\frac{j2\pi kt}{T_{OFDM}}\right) \right) rect_T(t - mT),$$

where C is a normalization constant. According to some embodiments, the WUS is overlaid on this OFDM signal to obtain a new signal $x_b(t)$ as follows:

$$x_b(t) = C \cdot \sum_{m=0}^{M-1} \left( \sum_{k=0}^{N-1} S_m(k) \exp\left(\frac{j2\pi kt}{T_{OFDM}}\right) \right) Window_{b(m)}(t - mT) rect_T(t - mT)$$

Naturally, the windowed signal $x_b(t)$ is different from the ideal signal x(t). Therefore, $x_b(t)$ can be considered as a perturbed version of the ideal signal. The perturbation, denoted by distortion(t), is easily calculated as distortion(t)=x(t)−$x_b$(t).

Some embodiments include using windows such that the performance impact to legacy OFDM receivers due to the perturbation introduced by windowing is small, and in practice often negligible. In particular, when BPSK is used, the perturbation signal is orthogonal to the OFDM signal in the frequency domain. The orthogonality guarantees that the optimum decision regions in the OFDM demodulator are not changed and that the energy assigned to the OFDM signal is maximized under the constraints that the total power the WUS power are given and fixed.

OFDM is usually implemented digitally, and it is therefore convenient to give a digital representation of both the ideal and the perturbed baseband signals. The ideal baseband signal can be written in the following form. First, the m-th OFDM symbol is written in the form $$x_m(n) = \frac{1}{\sqrt{N}} \sum_{k=0}^{N-1} S_m(k) \exp\left(j2\pi \frac{kn}{N}\right) rect_{N_{tot}}(n),$$

where $rect_{N_{tot}}(n)$ is 1 if $0 \le n < N_{tot}$ and 0 otherwise. The digital OFDM signal is then written as $$x(n) = \sum_{m=0}^{M-1} x_m(n - mN_{tot}).$$

The perturbed OFDM signal is then written in the form $$x_b(n) = \sum_{m=0}^{M-1} x_m(n - m(N + N_{CP})) \cdot Window_{b(m)}(n - mN_{tot}).$$

The windows are assumed to be normalized such that the average power of the windowed signal $x_b(n)$ is equal to the average power of the ideal signal x(n):

$$\frac{1}{N} \sum_{n=0}^{N-1} E_{S,b}[|x_b(n)|^2] = \frac{1}{N} \sum_{n=0}^{N-1} E_S[|x(n)|^2].$$

Figure 16:
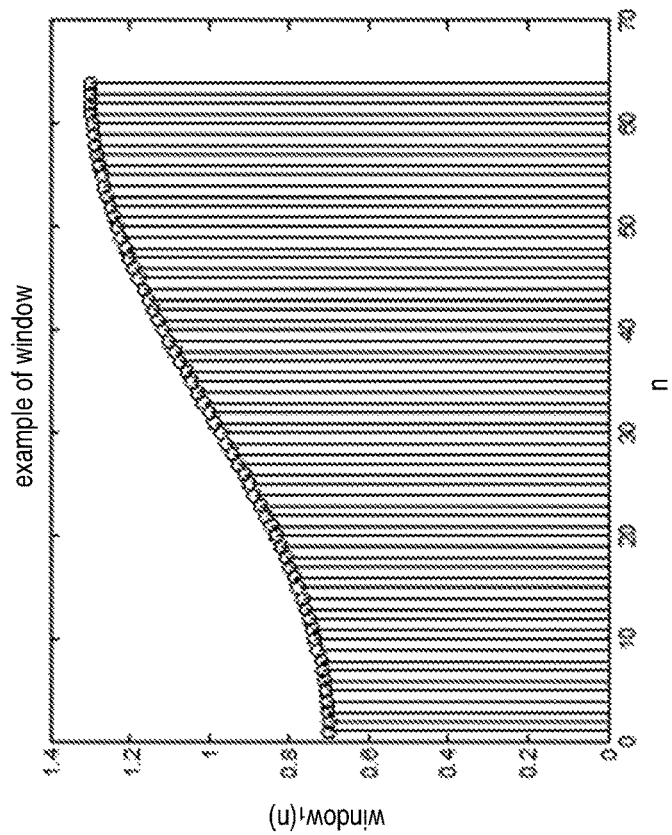
FIG. 16 illustrates examples of windowing functions, according to some embodiments.
Figure 16:
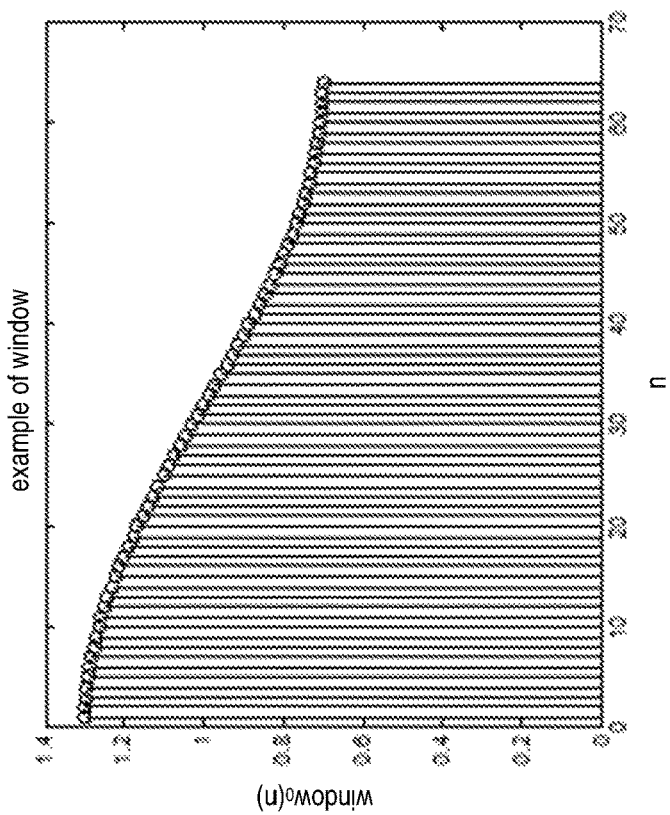

In this expression $E_{S,b}[\cdot]$ denotes expectation with respect to the joint distribution of the complex-valued constellation symbols and the WUS bits, while $E_S[\cdot]$ denotes expectation with respect to the joint distribution of the complex-valued constellation symbols. Examples of windows are given in FIG. 16, with N=64.

It is convenient to write the windowing functions in the form $Window_p(n)=\alpha \cdot (1+G_p(n))$, p=0,1.

The terms $G_p(n)$ can be interpreted as gains that distort the ideal OFDM signal. The term $\alpha$ is a positive normalization factor needed to ensure that the average energy in the windowed signal is equal to the average energy in the ideal signal. In order to understand the effect of windowing, consider the noiseless received signal x(n), after CP removal. It is enough to consider one OFDM symbol at a time, and therefore the index m will be dropped in what follows. It will also suffice to consider only one window, and hence the index p will also be dropped.

Recall that S(k), k=0, . . . , N−1 are real valued (BPSK). The OFDM symbol is then $$x(n) = \frac{1}{\sqrt{N}} \sum_{k=0}^{N-1} S(k) e^{j2\pi \frac{kn}{N}},$$

where $$x\left(\frac{N}{2} - n\right) = \overline{x\left(\frac{N}{2} + n\right)}, 0 < n < \frac{N}{2}$$

and x(0), $$x\left(\frac{N}{2}\right)$$

are real.

Let G (n) be a sequence of real-valued gains having the following symmetry:

$$G\left(\frac{N}{2}-n\right)+G\left(\frac{N}{2}+n\right)=0,\ 0\leq n\leq\frac{N}{2}$$

This means that G(n) possesses a co-called off symmetry. As an example, fix $$-1<F<1,$$

and define $$G(n):=\begin{cases}G,&0\leq n<\frac{N}{2}\\-G,&\frac{N}{2}\leq n<N\end{cases}.$$

$$\alpha=\frac{1}{\sqrt{1+G^2}}.$$

This window is exemplified in FIG. 14. The perturbed baseband signal is $$x_b(n):=\alpha\cdot(1+G(n))\cdot x(n)$$

Note that $x_b(n)$ is obtained by windowing $x(n)$ by means of the window $\alpha\cdot(1+G(n))$. The frequency domain signal is calculated as $$X_b(k):=\frac{1}{\sqrt{N}}\sum_{n=0}^{N-1}x_b(k)e^{-j2\pi\frac{kn}{N}}.$$

Using the definition of $x_b(n)$ it is seen that $$X_b(k):=\frac{\alpha}{\sqrt{N}}\sum_{n=0}^{N-1}(1+G(n))\cdot x(n)e^{-j2\pi\frac{kn}{N}}$$

$$=\frac{\alpha}{\sqrt{N}}\sum_{n=0}^{N-1}x(n)e^{-j2\pi\frac{kn}{N}}+\frac{\alpha}{\sqrt{N}}\sum_{n=0}^{N-1}G(n)x(n)e^{-j2\pi\frac{kn}{N}}.$$

Defining $$E(k):=\frac{\alpha}{\sqrt{N}}\sum_{n=0}^{N-1}G(n)x(n)e^{-j2\pi\frac{kn}{N}},$$

and $$S(k)=\frac{1}{\sqrt{N}}\sum_{n=0}^{N-1}x(n)e^{-j2\pi\frac{kn}{N}}$$

It can then be written that $$X_b(k)=\alpha\cdot S(k)+E(k).$$

The term $\alpha$ introduces a bias, while the term E(k) represents a distortion. Expanding the sum obtains $$E(k)=\frac{\alpha}{\sqrt{N}}\Bigg(G(0)x(0)+\sum_{n=1}^{\frac{N}{2}-1}G(n)x(n)e^{-j2\pi\frac{kn}{N}}+$$

$$G\left(\frac{N}{2}\right)x\left(\frac{N}{2}\right)e^{-j2\pi\frac{kN}{2N}}+\sum_{n=\frac{N}{2}+1}^{N-1}G(n)x(n)e^{-j2\pi\frac{kn}{N}}\Bigg).$$

Changing variables $$n\to\frac{N}{2}-n$$

in the first sum and $$n\to\frac{N}{2}+n$$

in the second sum obtains $$E(k)=\frac{\alpha}{\sqrt{N}}$$

$$\Bigg(G(0)x(0)+\sum_{n=1}^{\frac{N}{2}-1}G\left(\frac{N}{2}-n\right)x\left(\frac{N}{2}-n\right)e^{-j2\pi\left(\frac{N}{2}-n\right)\frac{kn}{N}}+G\left(\frac{N}{2}\right)x\left(\frac{N}{2}\right)e^{-j\pi k}+$$

$$\sum_{n=1}^{\frac{N}{2}-1}G\left(\frac{N}{2}+n\right)x\left(\frac{N}{2}+n\right)e^{-j2\pi\left(\frac{N}{2}+n\right)\frac{k}{N}}\Bigg).$$

Hence $$E(k)=\frac{\alpha}{\sqrt{N}}\Bigg(G(0)x(0)+\sum_{n=1}^{\frac{N}{2}-1}G\left(\frac{N}{2}-n\right)x\left(\frac{N}{2}-n\right)e^{-j2\pi\left(\frac{N}{2}-n\right)\frac{kn}{N}}e^{-j\pi k}+$$

$$G\left(\frac{N}{2}\right)x\left(\frac{N}{2}\right)e^{-j\pi k}+\sum_{n=1}^{\frac{N}{2}-1}G\left(\frac{N}{2}+n\right)x\left(\frac{N}{2}+n\right)e^{-j2\pi\frac{kn}{N}}e^{-j\pi k}\Bigg).$$

Regrouping terms arrives at $$E(k)=\frac{\alpha}{\sqrt{N}}\Bigg(G(0)x(0)+G\left(\frac{N}{2}\right)x\left(\frac{N}{2}\right)(-1)^k+$$

$$(-1)^k\sum_{n=1}^{\frac{N}{2}-1}G\left(\frac{N}{2}-n\right)\left[x\left(\frac{N}{2}-n\right)e^{j2\pi\frac{kn}{N}}-x\left(\frac{N}{2}+n\right)e^{-j2\pi\frac{kn}{N}}\right]\Bigg).$$

Using the symmetry of x(n) obtains $$E(k)=\frac{\alpha}{\sqrt{N}}\Bigg(G(0)x(0)+G\left(\frac{N}{2}\right)x\left(\frac{N}{2}\right)(-1)^k+$$

$$(-1)^k\sum_{n=1}^{\frac{N}{2}-1}G\left(\frac{N}{2}-n\right)\left[x\left(\frac{N}{2}-n\right)e^{j2\pi\frac{kn}{N}}-\overline{x\left(\frac{N}{2}+n\right)}e^{j2\pi\frac{kn}{N}}\right]\Bigg).$$

Observe that $$x\left(\frac{N}{2}-n\right)e^{j2\pi\frac{kn}{N}} - \overline{x\left(\frac{N}{2}-n\right)e^{j2\pi\frac{kn}{N}}} = 2j\mathcal{J}m\left(x\left(\frac{N}{2}-n\right)e^{j2\pi\frac{kn}{N}}\right).$$

It follows that $$E(k) = \frac{\alpha}{\sqrt{N}}\left(G(0)x(0) + G\left(\frac{N}{2}\right)x\left(\frac{N}{2}\right)(-1)^k + \right.$$

$$\left. (-1)^k 2j \sum_{n=1}^{\frac{N}{2}-1} G\left(\frac{N}{2}+n\right)\mathcal{J}m\left(x\left(\frac{N}{2}-n\right)e^{j2\pi\frac{kn}{N}}\right)\right).$$

From this expression, it follows immediately that $$\mathfrak{R}e(E(k)) = \frac{\alpha}{\sqrt{N}}\left(G(0)x(0) + G\left(\frac{N}{2}\right)x\left(\frac{N}{2}\right)(-1)^k\right),$$

$$\mathcal{J}m(E(k)) = \frac{2\alpha(-1)^k}{\sqrt{N}}\left(\sum_{n=1}^{\frac{N}{2}-1} G\left(\frac{N}{2}-n\right)\mathcal{J}m\left(x\left(\frac{N}{2}-n\right)e^{j2\pi\frac{kn}{N}}\right)\right).$$

Furthermore, note that $$\lim_{N\to\infty} \mathfrak{R}e(E(k)) = 0$$

Hence $E(k) \cong j \cdot \mathcal{J}m(E(k))$ is a purely imaginary noise. That is, $$X_b(k) = \alpha \cdot S(k) + j \cdot \mathcal{J}m(E(k)).$$

Figure 17:
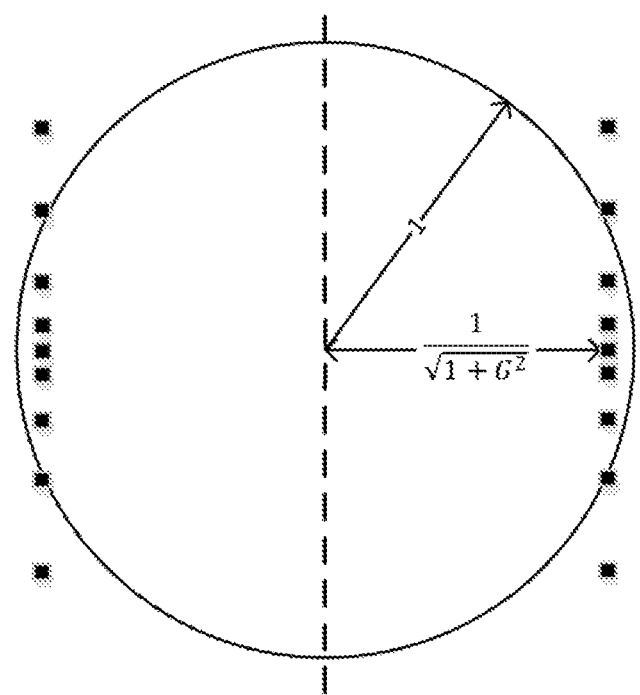
FIG. 17 illustrates perturbed constellation symbols, according to some embodiments.
Figure 18:
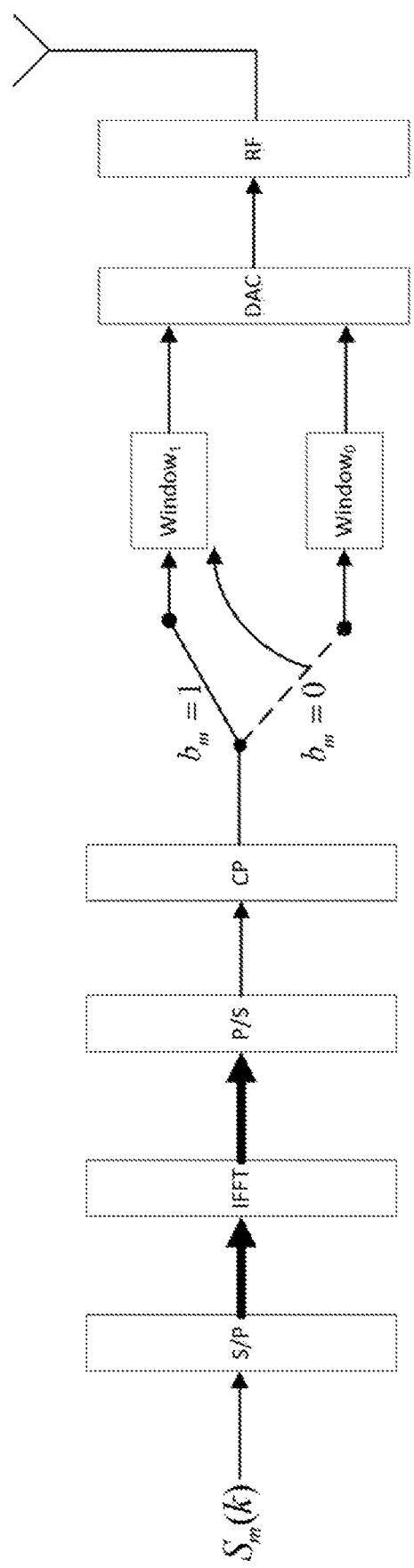
FIG. 18 illustrates an OFDM modulator, according to some embodiments.

Hence, at the receiving side, after the FFT, the distortion introduced by the ASK at the transmitting side is orthogonal to the desired signal. Notice also that a bias α is introduced on the constellation symbols. Note that the optimum decision regions for $X_b(k)$ and $S(k)$ are the same, namely the right and left half planes. The perturbed symbols $X_b(k)$ are illustrated in FIG. 17, together with a dashed line depicting the boundary of the optimum decision regions. The windows used are as exemplified in FIG. 14. An OFDM modulator according to the present embodiment of the invention is shown in FIG. 18. Again, the illustrated OFDM modulator may be implemented with the processing circuits 32 and main transceiver circuit 35 of FIG. 1.

As described above, a WUS may be signaled to a WUR by means of ASK overlaid on an underlaid OFDM data signal. The OFDM signal may be generated by a node in a wireless communication system where there are legacy devices that are not aware of an overlaid WUS. An example of such transmission may be beacon transmissions using OFDM from the Access Point (AP) to STA's in a Wi-Fi system. ASK has lower rate than the legacy system and is implemented through perturbations of the original signal. These perturbations are performed in such a way that the optimum decision regions for any legacy OFDM demodulator do not change. The perturbations can either be done in frequency or in time domain.

In some cases, perturbations in the frequency domain are carried out over (at least) one full OFDM symbol in the legacy system. If the underlaid communication system is based on pulse amplitude modulation (PAM), the overlaid ASK can be signaled by adding energy in the orthogonal dimension, i.e., introducing phase perturbations. These phase perturbations are orthogonal to the PAM. Thus, the decision regions in the PAM system remains the same. An example of PAM is BPSK constellation mapping in an OFDM system. Here, symbols consisting of −1's and 1's are used to signal data. The perturbation applied to signal ASK is introduced by adding an imaginary component to the BPSK symbols.

If the underlaid communication system is using BPSK, QPSK, or 8PSK, the additional power in the overlaid ASK can be added by perturbations in the amplitude of the signal. Since the decision regions for these constellations are fully characterized by the phase of the signal, the alternations in amplitude does not change the decision regions.

In other cases, perturbations in the time domain are carried out by applying energy increase/decrease in time windows. If the window length is one full symbol length, the same effect is achieved as in the case above that used BPSK, QPSK, or 8PSK. If the underlaid communication system is based on OFDM using BPSK, there will be a symmetry over each OFDM symbol in the time domain. This symmetry can be exploited to apply ASK by increasing/decreasing the power within an OFDM symbol such that the first part of the OFDM symbol uses one power and the second part uses another power. When this is done, the power modification will not impact the decision region of the OFDM system. Although the perturbation is best suited for BPSK, it also works for higher order modulations.

Figure 19:
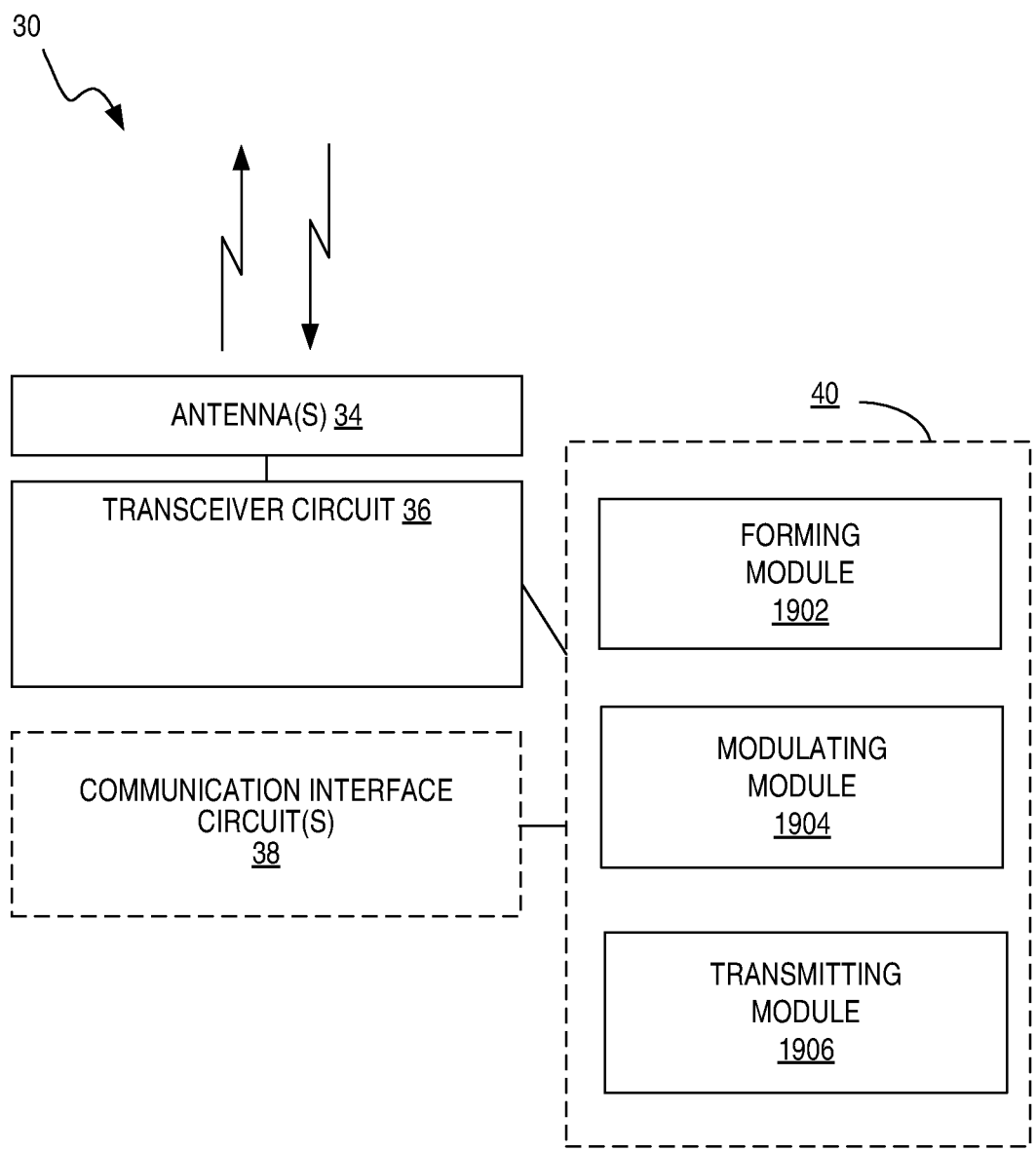
FIG. 19 is a block diagram illustrating a functional implementation of a transmitting device, according to some embodiments.

FIG. 19 illustrates an example functional module or circuit architecture as may be implemented in the transmitting device 30. The illustrated embodiment at least functionally includes a forming module 1902 for forming an OFDM signal comprising a plurality of OFDM symbols and carrying user data targeted to a main transceiver of one or more receiving devices. The implementation also includes a modulating module 1904 for modulating the OFDM signal with a WUS targeted to a wake-up receiver of a first receiving device other than the one or more receiving devices, where said modulating is performed so as to superimpose a modulation of signal power on the OFDM signal, the resulting variations in signal power conveying the wake-up signature. The implementation includes a transmitting module 1906 for transmitting the modulated OFDM signal.

Figure 20:
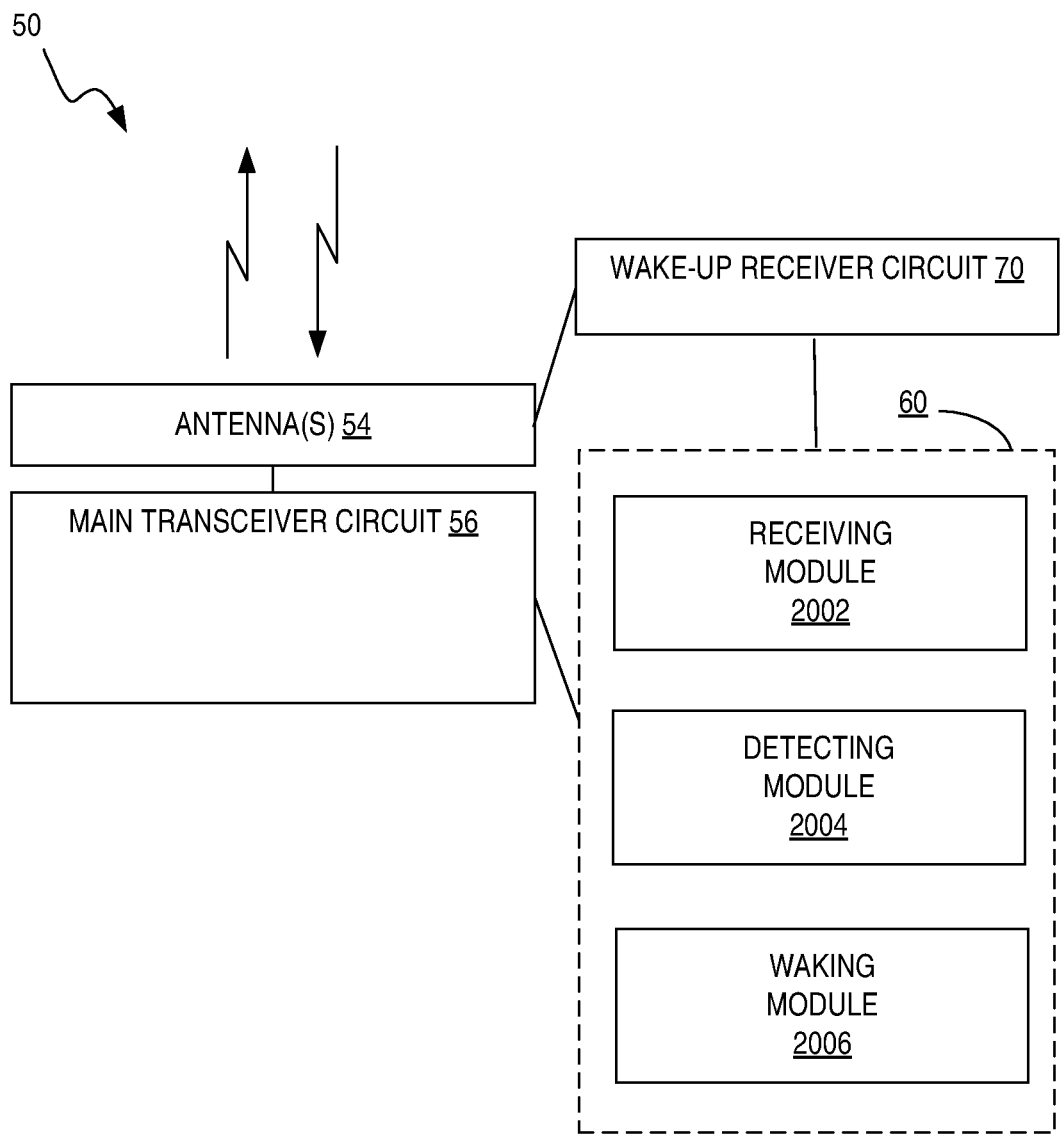
FIG. 20 is a block diagram illustrating a functional implementation of a receiving device, according to some embodiments.

FIG. 20 illustrates an example functional module or circuit architecture as may be implemented in the receiving device 50. The illustrated embodiment at least functionally includes a receiving module 2002 for receiving, at the WUR, an OFDM signal comprising a plurality of OFDM symbols and carrying user data targeted to a main transceiver of one or more receiving devices other than the receiving device. The implementation also includes a detecting module 2004 for detecting a WUS modulated in the OFDM signal, where the WUS comprises a superimposition of signal power on the OFDM signal, the resulting variations in signal power conveying the WUS. The implementation includes a waking module 2006 for waking up the main transceiver in response to the detecting.

While the embodiments described above are discussed in the explicit context of OFDM signals, some embodiments may include modulating a single (sub)carrier signal. For example, a transmitting device may form a single subcarrier signal comprising a plurality of symbols and carrying user data targeted to a main transceiver of one or more receiving devices. The transmitting device may also modulate the signal with a WUS targeted to a WUR of a first receiving device other than the one or more receiving devices, where the modulating is performed so as to superimpose a modulation of signal power on the signal, the resulting variations in signal power conveying the WUS. The modulated signal is then transmitted. In such a case, the modulation may involve phase modulation.

A receiving device may then receive, at the WUR, the signal and detect the WUS modulated in the signal, wherein the WUS comprises a superimposition of signal power on the signal, the resulting variations in signal power conveying the WUS. The receiving device then wakes up the main transceiver in response to the detecting.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a transmitting device, comprising:
forming an Orthogonal Frequency-Division Multiplexing (OFDM) signal comprising a plurality of OFDM symbols and carrying user data targeted to a main transceiver of each of one or more receiving devices;
modulating the OFDM signal with a wake-up signature (WUS) targeted to a wake-up receiver (WUR) of a first receiving device other than the one or more receiving devices, wherein said modulating comprises superimposing a series of logical ones and zeroes of the WUS onto a series of OFDM symbols by varying the signal power across the series of OFDM symbols without blanking out user data carried by the series of OFDM symbols, the resulting variations in signal power conveying the logical ones and zeros of the WUS; and
transmitting the modulated OFDM signal.

2. The method of claim 1, wherein logical ones and zeroes of the WUS are superimposed onto fewer than all of the OFDM symbols carrying the user data.

3. The method of claim 1, wherein the user data is carried in the OFDM signal by real-valued frequency-domain symbols, and wherein modulating the OFDM signal with the WUS comprises:
signaling a first logical bit value of the WUS with a first OFDM symbol of the OFDM signal by adding imaginary-valued frequency-domain symbols to the real-valued frequency-domain symbols in the first OFDM symbol; and
signaling a second logical bit value of the WUS with a second OFDM symbol of the OFDM signal by refraining from adding imaginary-valued energy to the real-valued frequency-domain symbols in the second OFDM symbol.

4. A method at a receiving device having a wake-up receiver (WUR) and a main transceiver of the receiving device, wherein the WUR uses less power than the main transceiver to listen for a wake-up signature (WUS) in order to wake up the main transceiver to receive user data, the method comprising:
receiving, at the WUR, an Orthogonal Frequency-Division Multiplexing (OFDM) signal comprising a plurality of OFDM symbols and carrying user data targeted to a main transceiver of one or more receiving devices other than the receiving device;
detecting a WUS modulated in the OFDM signal, wherein the WUS comprises a superimposition of a series of logical ones and zeroes of the WUS onto a series of OFDM symbols by varying the signal power across the series of OFDM symbols without blanking out user data carried by the series of OFDM symbols, the resulting variations in signal power conveying the logical ones and zeros of the WUS; and
waking up the main transceiver in response to the detecting.

5. The method of claim 4, wherein the user data is conveyed in the OFDM signal with frequency-domain symbols taken from a phase-shift-keying (PSK) symbol constellation, and wherein the detecting comprises:
determining a first logical bit value of the WUS signaled with a first OFDM symbol of the OFDM signal by detecting a first amplitude for the first OFDM symbol; and
determining a second logical bit value of the WUS signaled with a first OFDM symbol of the OFDM signal by detecting a second amplitude for the second OFDM symbol, the second amplitude differing from the first amplitude.

6. The method of claim 4, wherein the detecting comprises:
determining a first logical bit value of the WUS signaled in a first signaling period by detecting a first windowing function applied to an OFDM symbol in the first signaling period; and
determining a second logical bit value signaled in a second signaling period by detecting a second windowing function applied to an OFDM symbol in the second signaling period.

7. A transmitting device, comprising:
transceiver circuitry configured to receive and transmit signals; and
processing circuitry operatively associated with the transceiver circuitry and configured to:
form an Orthogonal Frequency-Division Multiplexing (OFDM) signal comprising a plurality of OFDM symbols and carrying user data targeted to a main transceiver of one or more receiving devices;
modulate the OFDM signal with a wake-up signature (WUS) targeted to a wake-up receiver (WUR) of a first receiving device other than the one or more receiving devices, wherein said modulation comprises superimposing a series of logical ones and zeroes of the WUS onto a series of OFDM symbols by varying the signal power across the series of OFDM symbols without blanking out user data carried by the series of OFDM symbols, the resulting variations in signal power conveying the logical ones and zeros of the WUS; and
transmit the modulated OFDM signal.

8. The transmitting device of claim 7, wherein logical ones and zeroes of the WUS are superimposed onto fewer than all of the OFDM symbols carrying the user data.

9. The transmitting device of claim 7, wherein the user data is carried in the OFDM signal by real-valued frequency-domain symbols, and wherein the processing circuitry is configured to modulate the OFDM signal with the WUS by:
signaling a first logical bit value of the WUS with a first OFDM symbol of the OFDM signal by adding imaginary-valued frequency-domain symbols to the real-valued frequency-domain symbols in the first OFDM symbol; and signaling a second logical bit value of the WUS with a second OFDM symbol of the OFDM signal by refraining from adding imaginary-valued energy to the real-valued frequency-domain symbols in the second OFDM symbol.

10. The transmitting device of claim 7, wherein the user data is carried in the OFDM signal by imaginary-valued frequency-domain symbols, and wherein the processing circuitry is configured to modulate the OFDM signal with the WUS by:

signaling a first logical bit value of the WUS with a first OFDM symbol of the OFDM signal by adding real-valued frequency-domain symbols to the imaginary-valued frequency-domain symbols in the first OFDM symbol; and signaling a second logical bit value of the WUS with a second OFDM symbol of the OFDM signal by refraining from adding real-valued energy to the imaginary-valued frequency-domain symbols in the second OFDM symbol.

11. A receiving device, comprising:

main transceiver circuitry;

wake-up receiver (WUR) circuitry, wherein the WUR circuitry uses less power than the main transceiver circuitry to listen for the WUS in order to wake up the main transceiver circuitry to receive user data; and processing circuitry operatively associated with the main transceiver circuitry and the WUR circuitry, and configured to:

receive, at the WUR circuitry, an Orthogonal Frequency-Division Multiplexing (OFDM) signal comprising a plurality of OFDM symbols and carrying user data targeted to a main transceiver of one or more receiving devices other than the receiving device;

detect a WUS modulated in the OFDM signal, wherein the WUS comprises a superimposition of a series of logical ones and zeroes of the WUS onto a series of OFDM symbols by varying the signal power across the series of OFDM symbols without blanking out user data carried by the series of OFDM symbols, the resulting variations in signal power conveying the logical ones and zeros of the WUS; and wake up the main transceiver circuitry in response to the detecting.

12. The receiving device of claim 11, wherein the user data is conveyed in the OFDM signal with frequency-domain symbols taken from a phase-shift-keying (PSK) symbol constellation, and wherein the processing circuitry is configured to detect the WUS by:

determining a first logical bit value of the WUS signaled with a first OFDM symbol of the OFDM signal by detecting a first amplitude for the first OFDM symbol; and determining a second logical bit value of the WUS signaled with a first OFDM symbol of the OFDM signal by detecting a second amplitude for the second OFDM symbol, the second amplitude differing from the first amplitude.

13. The receiving device of claim 11, wherein the processing circuitry is configured to detect the WUS by:

determining a first logical bit value of the WUS signaled in a first signaling period by detecting a first windowing function applied to an OFDM symbol in the first signaling period; and determining a second logical bit value signaled in a second signaling period by detecting a second windowing function applied to an OFDM symbol in the second signaling period.

14. The receiving device of claim 13, wherein the first and second windowing functions correspond to Manchester coding.

* * * * *